(12) United States Patent
Funakoshi et al.

(10) Patent No.: US 6,423,813 B1
(45) Date of Patent: Jul. 23, 2002

(54) BRANCHED AROMATIC POLYCARBONATE, AND PRODUCTION METHOD AND BLOW-MOLDED ARTICLE THEREOF

(75) Inventors: Wataru Funakoshi; Yuichi Kageyama; Hiroaki Kaneko; Katsushi Sasaki, all of Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/959,075

(22) PCT Filed: Apr. 18, 2000

(86) PCT No.: PCT/JP00/02524

§ 371 (c)(1),
(2), (4) Date: Oct. 18, 2001

(87) PCT Pub. No.: WO00/63275

PCT Pub. Date: Oct. 26, 2000

(30) Foreign Application Priority Data

Apr. 19, 1999 (JP) ............................................. 11-110950
Aug. 26, 1999 (JP) ............................................. 11-239791

(51) Int. Cl.$^7$ ............................................. C08G 64/00
(52) U.S. Cl. .................... 528/196; 264/176.1; 525/132; 525/461; 528/198
(58) Field of Search ....................... 264/176.1; 525/132, 525/461; 528/196, 198

(56) References Cited

U.S. PATENT DOCUMENTS

| | | | | |
|---|---|---|---|---|
| 3,541,049 A | * | 11/1970 | Cleveland et al. | 528/196 |
| 4,185,009 A | * | 1/1980 | Idel et al. | 528/196 |
| 4,431,793 A | * | 2/1984 | Rosenquist | 528/198 |
| 4,469,861 A | * | 9/1984 | Mark et al. | 528/196 |

FOREIGN PATENT DOCUMENTS

| | | |
|---|---|---|
| JP | A 54-129684 | 10/1979 |
| JP | A 59-90635 | 5/1984 |
| JP | A 60-249798 | 12/1985 |
| JP | A 4-171040 | 6/1992 |
| JP | 5-295101 | 11/1993 |
| JP | A 7-341106 | 2/1995 |
| JP | 7-90074 A | 4/1995 |
| JP | Y2 7-34023 | 8/1995 |
| JP | 7-278286 | 10/1995 |
| JP | A 7-304511 | 11/1995 |
| JP | 11-209469 A | 8/1999 |

OTHER PUBLICATIONS

Patent Abstracts of Japan, JP–A–7–90074, date Apr. 4, 1995.
Patent Abstracts of Japan, JP–A–11–209469, date Aug, 3, 1999.
Patent Abstracts of Japan, JP–A–7–278286, date Oct. 24, 1995.
Patent Abstracts of Japan, JP–A–5–295101, date Nov. 9, 1993.

* cited by examiner

*Primary Examiner*—Terressa M. Boykin
(74) *Attorney, Agent, or Firm*—Sughrue Mion, PLLC

(57) ABSTRACT

A method for producing a high-quality thermoplastic branched polycarbonate which is used in blow-molding, extrusion or vacuum molding from a linear aromatic polycarbonate efficiently. The thermoplastic branched polycarbonate is produced by melt-mixing and reacting a substantially linear aromatic polycarbonate with an acid anhydride having at least two cyclic acid anhydride groups in a molecule in the presence of a basic catalyst.

17 Claims, No Drawings

BRANCHED AROMATIC POLYCARBONATE, AND PRODUCTION METHOD AND BLOW-MOLDED ARTICLE THEREOF

TECHNICAL FIELD

The present invention relates to a branched aromatic polycarbonate and production method and blow-molded article thereof.

BACKGROUND ART

An aromatic polycarbonate resin (to be sometimes referred to simply as "polycarbonate" hereinafter) is a high-performance engineering plastic having a number of excellent physical properties such as high optical transparency, toughness, dimensional stability, and excellent impact strength over a wide range of temperatures and used in a wide variety of fields.

However, when the polycarbonate is blow-molded, extruded or vacuum-molded, it may cause a nonuniform thickness or a drawdown in a molded article since it has a low structural viscosity index when molten. Therefore, a satisfactory molded article may not be obtained.

Particularly, a polycarbonate which is different from an ordinary polycarbonate and which has specific viscosity-average molecular weight and structural viscosity index is considered to be preferable for blow-molding a large-capacity hollow article or a large-size panel.

The melt properties of a polycarbonate can be expressed by an expression: $Q = K \cdot P^N$ (wherein Q is a flow rate (mL/sec) of a molten resin, K is a constant, P is pressure (kg/cm$^2$) and N is a structural viscosity index). In the above expression, it represents Newtonian flowability when N is 1, and non-Newtonian flowability increases as the value of N increases. In other words, the flow properties of a molten resin are evaluated based on the value of N.

Heretofore, it has been attempted and practiced to incorporate an appropriate amount of a branch structure into the molecules of the polycarbonate as a means for increasing the value of the above N appropriately to attain suitable structural viscosity.

A thermoplastic branchd polycarbonate having the high structural viscosity and suitable for blow molding, such as a bisphenol A-type polycarbonate having a branch structure, is produced by an interfacial polymerization method or a melt polymerization method based on transesterification.

U.S. Pat. No. 3,799,953 discloses a technique for producing a polycarbonate having high structural viscosity and suitable for blow molding by carrying out an interfacial polymerization method using, as a branching agent, a polyhydric phenol having at least three hydroxyl groups in a molecule such as 1,1,1-tris(4-hydroxyphenyl)ethane (THPE for short), 1,3,5-tris(4-hydroxyphenyl)benzene or 1,4-bis(4', 4"-dihydroxytriphenylmethyl)benzene.

In addition, as a method for producing a thermoplastic branched polycarbonate, a method using cyanuric chloride as a branching agent (refer to U.S. Pat. No. 3,541,049), a method using a branched dihydric phenol as a branching agent (refer to U.S. Pat. No. 4,469,861) and a method using 3,3-bis (4-hydroxyaryl)oxyindole as a branching agent (refer to U.S. Pat. No. 4,185,009) have been proposed. Further, U.S. Pat. No. 4,431,793 discloses a polycarbonate which is terminal-capped with a branched alkylacyl halide and/or acid and which has improved properties.

Japanese Patent Laid-Open Publication No. 7-70304 discloses a method for producing a branched polycarbonate containing boric acid or a boric acid ester as a thermal stabilizer by mixing a dihydric phenol with a carbonic acid ester, adding a small amount of a multifunctional organic compound having at least three functional groups as a branching agent to the mixture and subjecting the resulting mixture to melt transesterification in the presence of a catalyst and boric acid or a boric acid ester.

Japanese Patent Laid-Open Publication No. 7-90074 discloses a method for producing a polycarbonate by adding a bi- or higher-valent active diester, acid halide or acid anhydride when or after the conversion ratio of transesterification exceeds 70%. It also discloses in the Examples therein as a specific example in case that an active diester or acid halide was added when the conversion ratio was 92%.

Japanese Patent Laid-Open Publication No. 11-209469 discloses a method in which a polyfunctional phenolic or carboxylic branching agent and a basic transesterification catalyst are caused to react with each other and the obtained reaction product is melt-mixed with a linear polycarbonate to branch and cross-link the polycarbonate.

As described above, to produce a thermoplastic branched polycarbonate having a specific structural viscosity index, a branching agent must be incorporated into a molecule structure. Therefore, the branching agent must be added to a reaction system as a copolymerizable component at the time of polymerization.

Thus, since the production of the branched polycarbonate requires use of a branching agent, it requires. different monomers as raw materials from those used in the production of a typical linear polycarbonate. As a matter of course, the inclusion of a branching agent in a linear polycarbonate modifies the physical properties of the linear polycarbonate significantly. Thus, to avoid the inclusion of a branching agent, the branched polycarbonate must be produced by using a plant which is different from that for producing a linear polycarbonate or using a production plant for the linear polycarbonate after the plant is temporarily halted and its contents are washed out. Therefore, the production of a special product by use of different monomers from those used in a general-purpose product, particularly the production of a branched polycarbonate, causes a decrease in the efficiency (productivity) of a production plant and an increase in production costs.

As a method for solving the problems, there has been proposed a method in which a branched polycarbonate suitable for blow molding is produced by using a branching agent not as a comonomer at the time of polycondensing the polycarbonate but for modifying the pre-prepared liner polymer of the polycarbonate (refer to Japanese Patent Publication No. 7-116285). This method tries to solve the above problems by causing a polyhydric phenol to react with a linear polycarbonate in an extruder or the like in the presence of a catalyst.

However, in the above method in which the polyhydric phenol is caused to react with the linear polycarbonate, as is easily understood from its reaction mechanism, the phenolic OH groups of the polyhydric phenol as a branching agent cut the molecular chain of the polycarbonate, whereby the molecular weight of the polycarbonate decreases and the amount of free dihydric phenols in the polycarbonate increases. In addition, since a decrease in the amount of dihydric phenols in a polycarbonate resin has been widely desired from the viewpoint of environmental safety, such a method which eventually increases the amount of the free dihydric phenols cannot be said to be a preferable method.

That is, in a conventionally known method in which a polyvalent hydroxy compound is caused to react with a linear polycarbonate to produce a branched polycarbonate, as described in Japanese Patent Publication No. 7-116285, a phenoxide produced from the reaction of a polyhydric phenol as a branching agent and an equilibration catalyst reacts with linear polycarbonate molecules, cuts the molecular chain of the polycarbonate and produces low-molecular-weight fragments and branched polycarbonate molecules, and the reaction further proceeds to achieve equilibration. Therefore, the molecular weight of the branched polycarbonate becomes lower than the molecular weight of the starting linear polycarbonate according to the amount of the branching agent added. This is also clear from Examples 9 and 10 of Japanese Patent Publication No. 7-116285 which show that an increase from 0.5 mol % to 1.0 mol % in the amount of 1,1,1-tris(4-hydroxyphenyl)ethane to be applied decreases the intrinsic viscosity of "Lexan 130" from 0.541 to 0.493 significantly. Such a decrease in molecular weight is not a negligible problem since it also causes deterioration in mechanical properties of a molded article, particularly high impact resistance which is a characteristic of a polycarbonate.

Further, since the OH groups of a polyhydric phenol as a branching agent have the characteristic that they are liable to be oxidized and decomposed under heating, they have the defect that they are oxidized and decomposed at the time of molding or the like and causes coloration of a branched polycarbonate or an undesirable side reaction such as production of foreign matters such as gels in the branched polycarbonate.

DISCLOSURE OF THE INVENTION

It is an object of the present invention to solve the above problems of the conventional method and provide a method for producing a branched polycarbonate of good quality with little decrease in molecular weight and production of little free dihydric phenols and with good productivity.

It is another object of the present invention to provide a method for producing a thermoplastic branched polycarbonate having a specific structural viscosity index efficiently without using a comonomer copolymerization method adopting interfacial polymerization and/or transesterification.

It is still another object of the present invention to provide a method for producing a branched polycarbonate having suitable physical properties for blow molding by converting the melt properties of a linear polycarbonate without substantially decreasing the molecular weight of the linear polycarbonate and increasing the content of dihydric phenols.

It is still another object of the present invention to provide a method in which a specific catalyst is used to cause the above reaction to proceed efficiently.

It is still another object of the present invention to provide a branched polycarbonate resin for blow molding which is produced by using a linear polycarbonate for general use grade and a blow-molded article.

Still other objects and advantages of the present invention will be apparent from the following description.

The present inventors have made intensive studies to solve the above problems. As a result, they have found that a thermoplastic branched polycarbonate suitable for blow molding can be produced efficiently and economically by causing a linear polycarbonate having a high molecular weight to react with an acid anhydride having at least two cyclic acid anhydride groups in a molecule in the presence of a specific catalyst, without significantly decreasing the molecular weight of the linear polycarbonate, degrading the color tone of the linear polycarbonate and increasing the amount of residual dihydric phenols. The present invention has been completed by this finding.

That is, according to the present invention, firstly, the above objects and advantages of the present invention are achieved by a method for producing a branched aromatic polycarbonate, which comprises mixing and reacting a substantially linear aromatic polycarbonate which mainly comprises a recurring unit represented by the following formula (1):

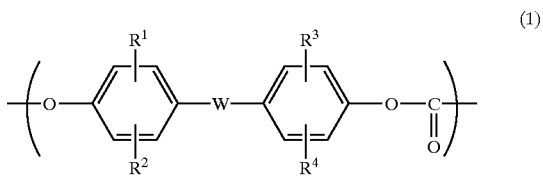

wherein $R^1$, $R^2$, $R^3$ and $R^4$ are independently a hydrogen atom, an alkyl group having 1 to 10 carbon atoms, an aryl group having 6 to 10 carbon atoms or an aralkyl group having 7 to 10 carbon atoms; and W is an alkylene group having 1 to 10 carbon atoms, an alkylidene group having 2 to 10 carbon atoms, a cycloalkylene group having 6 to 10 carbon atoms, a cycloalkylidene group having 6 to 15 carbon atoms, an arylene group having 6 to 10 carbon atoms, an alkylene-arylene-alkylene group having 8 to 15 carbon atoms, an oxygen atom, a sulfur atom, a sulfoxide group, a sulfone group or a direct bond, and which has a viscosity-average molecular weight of 10,000 to 50,000 with an acid anhydride having at least two cyclic acid anhydride groups in the molecule whose amount is 0.01 to 1 mole per mole of the above recurring unit, in a molten state in the presence of a basic catalyst in an extruder.

Secondly, the above objects and advantages of the present invention are to provide a branched aromatic polycarbonate obtained by the above method of the present invention.

Thirdly, the above objects and advantages of the present invention are achieved by a blow-molded article comprising the above branched aromatic polycarbonate of the present invention.

PREFERRED EMBODIMENT OF THE INVENTION

A detailed description will be in turn given to (A) a linear polycarbonate used in the method of the present invention, (B) an acid anhydride which has at least two cyclic acid anhydride groups in a molecule and is to be reacted with the linear polycarbonate, (C) a catalyst, (D) reaction conditions and (E) a branched polycarbonate obtained in the present invention and a resin composition comprising the branched polycarbonate as a main component hereinafter.

(A) Linear Polycarbonate

In the present invention, a linear polycarbonate whose main recurring unit is represented by the above formula (1) means a substantially linear polymer in which at least 50 mol % of polymer recurring units are constituted by the recurring unit represented by the above formula (1). The proportion of the recurring unit represented by the above formula (1) is preferably not lower than 60 mol %, more preferably higher than 70 mol %.

In the method of the present invention, as the above linear polycarbonate, a liner polymer is preferably used which is produced by subjecting one bisphenol or at least two of bisphenols typified by bisphenol A, a carbonate bond-forming compound and, as required, an ester-forming compound to a conventionally known method such as an interfacial polymerization method as exemplified by a phosgene method, a melt polymerization method or a solid phase polymerization method.

As the bisphenols used as raw materials for producing the above linear polycarbonate, compounds represented by the following formula (2) are preferably used.

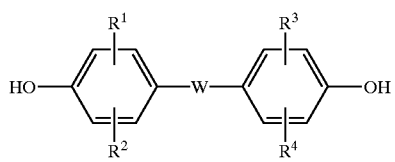

(2)

wherein $R^1$, $R^2$, $R^3$, $R^4$ and W are the same as defined for the above formula (1).

In the formulae (1) and (2), $R^1$, $R^2$, $R^3$ and $R^4$ are independently a hydrogen atom, an alkyl group having 1 to 10 carbon atoms, an aryl group having 6 to 10 carbon atoms or an aralkyl group having 7 to 10 carbon atoms; and W is an alkylene group having 1 to 10 carbon atoms, an alkylidene group having 2 to 10 carbon atoms, a cycloalkylene group having 6 to 10 carbon atoms, a cycloalkylidene group having 6 to 15 carbon atoms, an arylene group having 6 to 10 carbon atoms, an alkylene-arylene-alkylene group having 8 to 15 carbon atoms, an oxygen atom, a sulfur atom, a sulfoxide group, a sulfone group or a direct bond.

The alkyl group having 1 to 10 carbon atoms may be either linear or branched. Illustrative examples thereof include methyl, ethyl, propyl, butyl, octyl and decyl. Illustrative examples of the aryl group having 6 to 10 carbon atoms include phenyl, tolyl, cumyl and naphthyl. Illustrative examples of the aralkyl group having 7 to 10 carbon atoms include benzyl, 2-phenytyl and 2-methyl-2-phenylethyl.

Preferably, $R^1$, $R^2$, $R^3$ and $R^4$ are independently a hydrogen atom, a methyl group and a t-butyl group. Particularly preferably, they are independently a hydrogen atom.

The alkylene group having 1 to 10 carbon atoms may be either linear or branched. Illustrative examples thereof include methylene, 1,2-ethylene, 2,2-propylene, 2,2-butylene, 1,1-hexylene and 1,1-decamethylene.

Illustrative examples of the alkylidene group having 2 to 10 carbon atoms include ethylidene, propylidene, butylidene and hexylidene.

Illustrative examples of the cycloalkylene group having 6 to 10 carbon atoms include 1,4-cyclohexylene and 2-isopropyl-1,4-cyclohexylene.

Illustrative examples of the cycloalkylidene group having 6 to 15 carbon atoms include cyclohexylidene and isopropylcyclohexylidene.

Illustrative examples of the arylene group having 6 to 10 carbon atoms include 1,3-phenylene, 1,4-phenylene and 2,6-naphthylene.

Illustrative examples of the alkylene-arylene-alkylene group having 8 to 15 carbon atoms include m-diisopropylphenylene group.

W is preferably a cyclohexylidene group and a 2,2-propylidene group, particularly preferably a 2,2-propylidene group.

Specific examples of such bisphenols include the following compounds, that is,
1) bis(4-hydroxyaryl)alkanes such as 1,1-bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4'-dihydroxyphenyl-1,1'-m-diisopropylbenzene and 4,4'-dihydroxyphenyl-9,9-fluorene;
2) bis(hydroxyaryl)cycloalkanes such as 1,1-bis(4-hydroxyphenyl)cyclopentane, 1,1-bis(4-hydroxyphenyl)cyclohexane, 1-methyl-1-(4-hydroxyphenyl)-4-(dimethyl-4-4-hydroxyphenyl)methylcyclohexane, 4-[1-[3-(4-hydroxyphenyl)-4-methylcyclohexyl]-1-methylethyl]-phenol, 4,4'-[1-methyl-4-(1-methylethyl)-1,3-cyclohexanediyl]bisphenol and 2,2,2',2'-tetrahydro-3,3,3',3'-tetramethyl-1,1'-spirobis-[1H-indene]-6,6'-diol;
3) dihydroxyaryl ethers such as bis(4-hydroxyphenyl)ether, bis(4-hydroxy-3,5'-dichlorophenyl)ether and 4,4'-dihydroxy-3,3'-dimethylphenyl ether;
4) dihydroxydiaryl sulfides such as 4,4'-dihydroxydiphenyl sulfide and 4,4'-dihydroxy-3,3'-dimethyldiphenyl sulfide;
5) dihydroxydiaryl sulfoxides such as 4,4'-dihydroxydiphenyl sulfoxide and 4,4'-dihydroxy-3,3'-dimethyldiphenyl sulfoxide;
6) dihydroxydiaryl sulfones such as 4,4'-dihydroxydiphenyl sulfone and 4,4'-dihydroxy-3,3'-dimethyldiphenyl sulfone;
7) dihydroxydiaryl isatins such as 4,4'-dihydroxydiphenyl-3,3'-isatin;
8) dihydroxydiaryl xanthenes such as 3,6-dihydroxy-9,9-dimethylxanthene;
9) dihydroxybenzenes such as resorcin, 3-methyl resorcin, 3-ethyl resorcin, 3-butyl resorcin, 3-t-butyl resorcin, 3-phenyl resorcin, 3-cumyl resorcin, hydroquinone, 2-methyl hydroquinone, 2-ethyl hydroquinone, 2-butyl hydroquinone, 2-t-butyl hydroquinone, 2-phenyl hydroquinone and 2-cumyl hydroquinone; and
10) dihydroxydiphenyls such as 4,4'-dihydroxydiphenyl and 3,3'-dichloro-4,4'-dihydroxydipheynl.

These bisphenols may be used solely or in combination of two or more. Of these, 2,2-bis(4-hydroxyphenyl)propane (bisphenol A, BPA for short) is particularly preferable since it has excellent stability as a monomer and BPA containing little impurities can be easily obtained.

The molecules of the linear polycarbonate used in the present invention may contain (or be copolymerized with) at least one copolymerizable monomer as required in such an amount that the polymer remains substantially linear, for the purposes of controlling the glass transition temperature of a produced branched polycarbonate, improving the melt flowability of the branched polycarbonate, and controlling optical properties as exemplified by increasing the refractive index thereof and lowering birefringence thereof.

Specific examples of these copolymerizable monomers include aliphatic dihydroxy compounds such as ethylene glycol, 1,4-cyclohexanedimethanol, 2,2-dimethyl-1,3-propanediol, 1,10-decanediol, diethylene glycol, polyethylene glycol and polytetramethylene glycol; aliphatic or aromatic dicarboxylic acids such as succinic acid, isophthalic acid, 2,6-naphthalenedicarboxylic acid, adipic acid, cyclohexanedicarboxylic acid and terephthalic acid; and hydroxy acids such as p-hydroxybenzoic acid, 6-hydroxy-2-naphthoic acid and lactic acid.

Meanwhile, illustrative examples of the carbonate bond-forming compound used in the phosgene method include carbonyl halides such as phosgene and haloformate compounds. Further, illustrative examples of the carbonate bond-forming compound used in the melt polymerization method include aromatic carbonates such as diphenyl carbonate, ditolyl carbonate, bis(2-chlorophenyl)carbonate, m-cresyl carbonate, dinaphthyl carbonate and bis(4-phenylphenyl)carbonate. In addition, dimethyl carbonate, diethyl carbonate, dibutyl carbonate, dicyclohexyl carbonate and the like can also be used as desired. Of these, diphenyl carbonate (DPC for short) is particularly preferable from the viewpoints of reactivity, stability of an obtained resin against coloration, and costs.

In the solid phase polymerization method, a linear polycarbonate having a larger molecular weight can be obtained by crystallizing a small-molecular-weight polycarbonate oligomer produced by the above phosgene method or melt polymerization method and polymerizing the oligomer in a solid state at high temperatures and (as desired) under reduced pressure.

Further, in the production methods of the linear polycarbonate as described above, a so-called "polyester carbonate" containing ester bonds in the main chain is produced by using dicarboxylic acids and derivatives thereof such as dicarboxylic halide and dicarboxylic acid esters together with phosgens and dicarbonates. It should be understood that such a polymer is also included in the category of what is called "linear polycarbonate" in the present invention as long as at least 50 mol % of the recurring units of the produced polymer are constituted by the recurring unit represented by the above formula (1) and the polymer is substantially linear.

Illustrative examples of the above dicarboxylic acids or derivatives thereof which produce ester bonds include aromatic dicarboxylic acids or ester forming derivatives thereof such as terephthalic acid, isophthalic acid, terephthalic acid chloride, isophthalic acid chloride, diphenyl terephthalate and diphenyl isophthalate; aliphatic dicarboxylic acids or ester forming derivatives thereof such as succinic acid, glutaric acid, adipic acid, suberic acid, azelaic acid, sebacic acid, decanedioic acid, dodecanedioic acid, adipic acid chloride, suberic acid chloride, azelaic acid chloride, sebacic acid chloride, diphenyl azelate, diphenyl sebacate, decanedioic acid diphenyl and dodecanedioic acid diphenyl; and alicyclic carboxylic acids or ester forming derivatives thereof such as cyclopropanedicarboxylic acid, 1,3-cyclobutanedicarboxylic acid, 1,3-cyclopentanedicarboxylic acid, 1,3-cyclohexanedicarboxylic acid, 1,4-cyclohexanedicarboxylic acid, cyclopropanedicarboxylic acid chloride, 1,3-cyclobutanedicarboxylic acid chloride, 1,3-cyclopentanedicarboxylic acid chloride, 1,3-cyclohexanedicarboxylic acid chloride, 1,4-cyclohexanedicarboxylic acid chloride, cyclopropanedicarboxylic acid diphenyl, 1,3-cyclobutanedicarboxylic acid diphenyl, 1,3-cyclopentanedicarboxylic acid diphenyl, 1,3-cyclohexanedicarboxylic acid diphenyl and 1,4-cyclohexanedicarboxylic acid diphenyl.

Further, when the above linear polycarbonate is produced, small amount of a multifunctional compound having at least three functional groups in a molecule can also be used as desired. As such a multifunctional compound, a compound having phenolic hydroxy groups, carboxy groups or the like can be preferably used. Illustrative examples of the compound include 1,1,1-tris (4-hydroxyphenyl)ethane and $\alpha,\alpha,\alpha''$-tris(4-hydroxyphenyl)-1,3,5-triisopropylbenzene.

In the method of the present invention, since the multifunctional compound needs not to be copolymerized in advance at the time of producing the linear polycarbonate for the purpose of increasing the melt viscosity, the multifunctional compound, when used, is used in such an amount which ensures that the produced polycarbonate is a substantially linear polymer.

As the linear polycarbonate used as a raw material (material to be processed) in the method of the present invention, a linear polycarbonate is suitably used which has a terminal OH group concentration of preferably 5 to 70 mol %, more preferably 5 to 60 mol %, particularly preferably 7 to 50 mol %, based on the total of all terminal groups.

When the linear polycarbonate is produced by the phosgene method, the terminals of molecules are capped by a monofunctional compound added as a molecular weight modifier, and a linear polycarbonate which has a small concentration of terminal OH groups of substantially not higher than 10 mol % based on the total of all terminal groups can be obtained easily. In the melt polymerization method or solid phase polymerization method, it is appropriate to resort to means which decreases the number of the terminal OH groups aggressively.

From the standpoint of the common sense in the persons skilled in the art, it seems that the more terminal OH groups of the linear aromatic polycarbonate has, the further the reaction between the linear aromatic polycarbonate and the acid anhydride proceeds and the better result is obtained. However, it is surprising that contrary to the expectation, even if the number of the terminal OH groups of the linear polycarbonate is relatively small, the branching reaction proceeds sufficiently fast and a branched polycarbonate having a small amount of terminal OH groups and an excellent color tone, hydrolysis resistance and thermal aging resistance can be obtained.

The concentration of the terminal OH groups of the branched polycarbonate obtained by the method of the present invention is preferably not higher than 50 mol %, more preferably not higher than 40 mol %, much more preferably not higher than 30 mol % based on the total of all terminal groups.

Therefore, as the linear polycarbonate to be used as a raw material, a linear polycarbonate having a low concentration of terminal OH groups is suitable. To obtain a branched polycarbonate having the concentration of the terminal OH groups within the above range, when the phosgene method is employed to produce the linear polycarbonate, the concentration of the terminal OH groups is naturally adjusted to the above range by a terminal-capping agent used as a molecular weight modifier, or when the melt polymerization method or solid phase polymerization method which produces a large amount of terminal OH groups due to the characteristic of its reaction process is employed, special measures are preferably taken to decrease the terminal OH groups.

The reduction of the terminal OH groups in the melt polymerization method or the solid phase polymerization can be achieved by such a method as 1) a method of controlling the molar ratio of polymerization materials at the time of charging them into a polymerization reaction; that is, a method in which the terminal OH groups of the linear polycarbonate are decreased in advance by increasing the molar ratio of diphenyl carbonate (DPC)/bisphenol (BPA) at the time of charging them into a polymerization reaction, for example, by setting the molar ratio to be 1.03 to 1.10 in consideration of the characteristics of a polymerization reactor or 2) a terminal-capping method; that is, a method of capping terminal OH groups by a salicylate-based compound in accordance with, for example, the method described in U.S. Pat. No. 5,696,222, at any step between when the polymerization reaction is completed and when the branched polycarbonate is molded after the completion of the branching reaction. In this case, the salicylate-based compound is used in an amount of preferably 0.8 to 10 moles, more preferably 0.8 to 5 moles, particularly preferably 0.9 to 2 moles, per chemical equivalent of the terminal OH groups before the terminal-capping reaction. By adding the compound in such a proportion, at least 80 mol % of the terminal OH groups can be suitably capped, and a linear polycarbonate having very few terminal OH groups can be produced.

Illustrative examples of the salicylate useful in the above case include the following compounds, that is, 1) 2-methoxycarbonylphenyl-arylcarbonates such as 2-methoxycarbonylphenyl-phenylcarbonate, 2-methoxycarbonylphenyl-3'-butylphenylcarbonate, 2-methoxycarbonylphenyl-4'-hexadecylphenylcarbonate, 2-methoxycarbonylphenyl-2',4'-dibutylphenylcarbonate, 2-methoxycarbonylphenyl-cyclohexylphenylcarbonate, 2-methoxycarbonylphenyl-biphenylcarbonate, 2-methoxycarbonylphenyl-cumylphenylcarbonate, 2-methoxycarbonylphenyl-4'-butoxyphenylcarbonate, 2-methoxycarbonylphenyl-4-cumyloxyphenylcarbonate, bis(2-methoxycarbonylphenyl)carbonate and 2-methoxycarbonylphenyl-2-ethoxyphenylcarbonate;

2) 2-methoxycarbonylphenyl-alkylcarbonates such as 2-methoxycarbonylphenyl-methylcarbonate, 2-methoxycarbonylphenyl-butylcarbonate, 2-methoxycarbonylphenyl-laurylcarbonate and 2-methoxycarbonylphenyl-2'-ethoxycarbonylethylcarbonate;

3) 2-ethoxycarbonylphenyl-arylcarbonates such as 2-ethoxycarbonylphenyl-phenylcarbonate, 2-ethoxycarbonylphenyl-cumylphenylcatbonate, 2-ethoxycarbonylphenyl-4'-cumyloxyphenylcarbonate and bis(2-ethoxycarbonylphenyl)carbonate;

4) 2-ethoxycarbonylphenyl-alkylcarbonates such as 2-ethoxycarbonylphenyl-octylcarbonate and 2-ethoxycarbonylphenyl-carbonate;

5) (2'-methoxycarbonylphenyl)esters of aromatic carboxylic acids such as (2-methoxycarbonylphenyl)benzoate, (2-methoxycarbonylphenyl)-4-butylbenzoate, (2-methoxycarbonylphenyl)-4-cumylbenzoate, (2-methoxycarbonylphenyl)-4-butoxybenzoate, (2-methoxycarbonylphenyl)-4-ethoxycarbonylbenzoate, 3-(o-methoxycarbonylphenyl)oxycarbonyl(2'-methoxycarbonylphenyl)benzoate and 4-(o-ethoxycarbonylphenyl)oxycarbonyl(2'-methoxycarbonylphenyl)benzoate;

6) (2'-ethoxycarbonylphenyl)esters of aromatic carboxylic acids such as (2-ethoxycarbonylphenyl)benzoate, (2-ethoxycarbonylphenyl)-4-cumylbenzoate, (2-ethoxycarbonylphenyl)-4-methoxybenzoate and (2-ethoxycarbonylphenyl)-4-nonyloxybenzoate; and 7) aliphatic carboxylates such as (2-methoxycarbonylphenyl)acetate, (2-methoxycarbonylphenyl)stearate, bis(2-methoxycarbonylphenyl)succinate and bis(2-methoxycarbonylphenyl)adipate.

In the above phosgene method out of the above methods for producing the linear polycarbonate, tertiary amines, quaternary ammonium salts, tertiary phosphines, quaternary phosphonium salts, nitrogen-containing heterocyclic compounds and salts thereof, imino ethers and salts thereof, amido group-containing compounds and the like are suitably used as catalysts. In the phosgene method, since a large amount of an alkali metal compound or an alkaline earth metal compound is used as a scavenger for a hydrogen halide such as hydrochloric acid which is produced during the reaction, it is preferable to fully wash and purify the linear polycarbonate in order to prevent such impurities from remaining in the produced polymer.

Meanwhile, in the melt polymerization method and the solid phase polymerization method, a catalyst system containing an alkali metal compound is preferably used. The alkali metal compound used as the catalyst is used in an amount of preferably $5 \times 10^{-8}$ to $1 \times 10^{-6}$ chemical equivalents, in terms of alkali metal elements, per mole of the aromatic dihydroxy compound. By using the catalyst in such a proportion, the subsequent terminal-capping reaction can be carried out without decreasing the reaction rate of polycondensation, and a branching reaction and a main chain-cleaving reaction which are liable to occur during the polycondensation reaction and undesirable phenomena such as the generation and burning of foreign materials in the reactor at the time of molding can be inhibited effectively to produce a linear polycarbonate of good quality.

Illustrative examples of the alkali metal compound used as the catalyst include hydroxides, hydrocarbon compounds, carbonates, acetates, nitrates, nitrites, sulfites, cyanates, thiocyanates, stearates, borohydrides, benzoates, phosphoric acid hydride, bisphenol salts, and phenol salts of alkali metals. Specific examples thereof include sodium hydroxide, lithium hydroxide, sodium bicarbonate, sodium carbonate, cesium carbonate, sodium acetate, potassium acetate, lithium acetate, rubidium nitrate, lithium nitrate, rubidium nitrite, sodium sulfite, sodium cyanate, lithium cyanate, sodium thiocyanate, potassium thiocyanate, sodium stearate, cesium stearate, sodium borohydride, potassium borohydride, lithium borohydride, sodium tetraphenyl borate, sodium benzoate, lithium benzoate, disodium hydrogen phosphate, dilithium hydrogen phosphate, disodium salts, monosodium salts, monopotassium salts and sodium lithium salts of bisphenol A, and sodium salts and lithium salts of phenols.

Further, as the catalyst, a nitrogen-containing basic compound and/or a phosphorus-containing basic compound are/is preferably used together with the above alkali metal compound. Of these, specific examples of the nitrogen-containing basic compound include ammonium hydroxides having alkyl group, aryl group, alkylaryl group or other group in a molecule such as tetramethylammonium hydroxide ($Me_4NOH$), tetrabutylammonium hydroxide ($BU_4NOH$), benzyltrimethylammonium hydroxide ($\phi—CH_2(Me)_3NOH$) and hexadecyltrimethylammonium hydroxide; basic ammonium salts having an alkyl group, aryl group, alkylaryl group or other group such as tetramethylammonium acetate, tetraethylammonium phenoxide, tetrabutylammonium carbonate, benzyltrimethylammonium benzoate and hexadecyltrimethylammonium ethoxide; tertiary amines such as triethyl amine and hexadecyldimethylamine; and basic salts such as tetramethylammonium borohydride ($Me_4NBH_4$), tetrabutylammonium tetraphenylborate ($Bu_4NBPh_4$) and tetramethylammonium tetraphenylborate ($Me_4NBPh_4$).

Meanwhile, specific examples of the phosphorus-containing basic compound include phosphonium hydroxides having alkyl group, aryl group, alkylaryl group or other group such as tetrabutylphosphonium hydroxide ($Bu_4POH$), benzyltrimethylphosphonium hydroxide ($\phi—CH_2(Me)_3POH$) and hexadecyltrimethylphosphonium hydroxide; and basic salts such as tetramethylphosphonium borohydride ($Me_4PBH_4$), tetrabutylphosphonium borohydride ($Bu_4PBH_4$), tetrabutylphosphonium tetraphenylborate ($BU_4PBPh_4$) and tetramethylphosphonium tetraphenylborate ($Me_4PBPh_4$).

The above nitrogen-containing basic compound and/or the above phosphorus-containing basic compound are/is used in such a proportion that the amount of basic nitrogen atoms or basic phosphorus atoms is preferably $1\times10^{-5}$ to $5\times10^{-4}$ chemical equivalents, more preferably $2\times10^{-5}$ to $5\times10^{-4}$ chemical equivalents, particularly preferably $5\times10^{-5}$ to $5\times10^{-4}$ chemical equivalents, per mole of the aromatic dihydroxy compound.

Further, as the alkali metal compound used as desired as a catalyst in the present invention, (a) the ate complex alkali metal salts of the elements of the group XIV of the periodic table or (b) the alkali metal salts of oxoacids of the group XIV elements (namely, silicon, germanium and tin) of the periodic table. Use of the alkali metal compounds as the catalysts for a polycondensation reaction causes the polycondensation reaction to proceed quickly and to a sufficient degree advantageously and can keep the frequency of occurrence of undesirable side reactions which proceed during the polycondensation reaction, such as a branching reaction, at a low level.

The above ate complex alkali metal salts (a) of the elements of the group XIV of the periodic table are those disclosed in Japanese Patent Laid-Open Publication No. 7-268091. Specific examples thereof include $NaGe(OMe)_5$, $NaGe(OPh)_5$, $LiGe(OPh)_5$, $NaSn(OMe)_5$ and $NaSn(OPh)_5$.

Meanwhile, preferable examples of the above alkali metal salts (b) of oxoacids of the group XIV elements of the periodic table include alkali metal salts of silicic acid, stannic acid and germanic acid (IV). Specific examples of these include monosodium orthosilicate, tetrasodium orthosilicate, disodium monostannate, monolithium orthogermanate ($LiH_3GeO_4$), disodium orthogermanate (IV) and disodium digermanate (IV) ($Na_2Ge_2O_5$).

In the above polycondensation reaction, at least one compound selected from the group consisting of oxoacids, oxides, alkoxides and phenoxides of the elements of the group XIV of the periodic table may be allowed to coexist as co-catalysts with the above catalysts as required. By using these co-catalysts in a specific proportion, a branching reaction and a main chain-cleaving reaction which are liable to occur during the polycondensation reaction and undesirable phenomena such as the generation of foreign materials and burning of foreign materials in the reactor at the time of molding can be inhibited effectively without impairing the terminal-capping reaction and decreasing the rate of the polycondensation reaction to produce a target polymer of good quality.

Illustrative examples of the oxoacids of the group XIV elements of the periodic table include silicic acid, stannic acid and germanic acid. Illustrative examples of the oxides of the group XIV elements of the periodic table include silicon dioxide, tin dioxide, germanium dioxide, silicon tetrabutoxide, silicon tetraphenoxide, tetraethoxytin, tetraphenoxytin, tetramethoxygermanium, tetraphenoxygermanium and condensation products thereof.

These co-catalysts are preferably present in such a proportion that the amount of the group XIV elements of the periodic table is not larger than 50 moles per mole of the alkali metal elements in the polycondensation reaction catalysts. These co-catalysts are particularly preferably present in such a proportion that the amount of the group XIV elements of the periodic table as the co-catalysts is 0.1 to 30 moles per mole of the alkali metal elements in the polycondensation reaction catalysts.

The linear polycarbonate used in the method of the present invention may contain a stabilizer, a pigment and other additives as required. Since the method of the present invention which will be described later is essentially based on a base reaction, it is not preferable that the polymer contain such additives that make a reaction system acidic. Therefore, depending on the types of additives, some of them are preferably added after the formation of the branched polycarbonate.

In the method of the present invention, a high-molecular-weight polycarbonate having a viscosity-average molecular weight of 10,000 to 50,000 is used as the above linear polycarbonate. A linear polycarbonate having a lower viscosity-average molecular weight than the above range is not preferable because it is difficult to produce a branched polycarbonate having suitable properties for blow molding from such a linear polycarbonate even by the method of the present invention. The viscosity-average molecular weight is preferably 15,000 to 45,000.

(B) Acid Anhydride Having at Least Two Cyclic Acid Anhydride Groups (Branching Agent)

The acid anhydride used in the reaction with the above linear polycarbonate in the method of the present invention is a compound having at least two cyclic acid anhydride groups in a molecule. Specific examples of the acid anhydride include aromatic tetracarboxylic anhydrides such as pyromelletic dianhydride, 3,3',4,4'-benzophenonetetracarboxylic dianhydride, 2,3,3',4'-benzophenonetetracarboxylic dianhydride, 3,3',4,4'-biphenyltetracarboxylic dianhydride, 3,3',4,4'-biphenylethertetracarboxylic dianhydride, bis(3,4-dicarboxyphenyl)methane dianhydride, 2,2-bis(3',4'-dicarboxyphenyl)propane dianhydride, 2,2-bis(3',4'-dicarboxyphenyl)hexafluoropropane dianhydride, bis(3,4-dicarboxyphenyl)sulfone dianhydride, bis(3,4-dicarboxyphenyl)dimethylsilane dianhydride, bis(3,4-dicarboxyphenyl)tetramethyldisiloxane dianhydride, 1,4,5,8-naphthalenetetracarboxylic dianhydride, 2,3,6,7-naphthalenetetracarboxylic dianhydride, 3,3',4,4'-p-terphenyltetracarboxylic dianhydride, 3,3',4,4'-m-terphenyltetracarboxylic dianhydride and trimellitic anhydride ester; and aliphatic tetracarboxylic anhydrides such as butanetetracarboxylic dianhydride, 2,3,5-tricarboxycyclopentylacetic dianhydride, 2,3,5,6-tetracarboxybicyclooctane dianhydride and tetracyclododecanetetracarboxylic dianhydride. Of these, aromatic tetracarboxylic dianhydrides are preferable.

Further, compounds obtained by substituting the hydrogen atoms of these compounds with at least one substituent selected from the group consisting of a chlorine atom, a fluorine atom, a bromine atom, a methyl group, a methoxy group, a cyano group, a phenyl group, a phenoxy group and a cumyl group can also be used.

As the above acid anhydride, an acid anhydride having an acid anhydride group equivalent, that is, a molecular weight per acid anhydride group, of 85 to 1,000, particularly preferably 100 to 500, is used advantageously. Further, although depending on its conversion ratio the amount of the acid anhydride is preferably 0.01 to 1.0 moles, particularly preferably 0.01 to 0.5 moles, per polycarbonate recurring unit of the linear polycarbonate.

When the acid anhydride is added in a large amount and most of the acid anhydride reacts, there is the possibility that a large amount of gel is contained in the branched polycarbonate or that the branched polycarbonate itself is gelled. In the method of the present invention, since a relatively small amount of the acid anhydride is added and can cause branching at a high conversion ratio a branched polycarbonate having stable physical properties can be obtained. Therefore, the amount of the acid anhydride is preferably 0.01 to 0.5 moles per polycarbonate recurring unit of the linear polycarbonate.

In the method of the present invention, the above acid anhydride is mixed with the linear aromatic polycarbonate in a molten state either as it is or as a master batch.

The master batch is used as a polycarbonate composition containing an acid anhydride having at least two cyclic acid anhydride groups in a molecule, a substantially linear aromatic polycarbonate, and either no basic catalysts or deactivated basic catalysts.

As described above, the linear aromatic polycarbonate constituting the master batch contains either no basic catalysts or deactivated basic catalysts. A polycarbonate containing no basic catalysts can be prepared by carrying out polycondensation in the presence of basic catalysts and extracting the basic catalysts from the obtained polycarbonate to remove the catalysts. On the other hand, a polycarbonate containing deactivated basic catalysts can be prepared by carrying out polycondensation in the presence of basic catalysts as in the case of the polycarbonate containing no basic catalysts and adding, for example, a melt viscosity stabilizer to be described later to deactivate the basic catalysts.

The master batch is prepared by melt-kneading the thus-prepared polycarbonate and an acid anhydride together until the acid anhydride is dispersed uniformly. The acid anhydride does not react with the polycarbonate even under melt-kneading because basic catalysts are either not present or deactivated even if present. The content of the acid anhydride in the master batch is preferably 1 to 50% by weight, more preferably 5 to 20% by weight.

By using the acid anhydride in the form of a master batch, the smooth and precise operation of the present invention can be facilitated.

(C) Catalysts

In the method of the present invention, basic catalysts are used as the catalysts when the linear polycarbonate and the above acid anhydride (branching agent) are caused react with each other.

In the preferred embodiments of the present invention, catalysts containing at least one of the following basic compounds (I), (II) and (III) are used.

The term "catalyst" as used herein includes not only compounds which serve as conventional catalysts but also those which serve as conventional initiators or accelerators after undergone chemical changes.

(I) Alkali Metal Compounds and Alkaline Earth Metal Compounds

Illustrative examples of the alkali metal compounds and alkaline earth metal compounds include hydroxides, hydrocarbon compounds, carbonates, acetates, nitrates, nitrites, sulfites, cyanates, thiocyanates, stearates, borohydrides, benzoates, phosphoric acid hydride, bisphenol salts, and phenol salts of alkali metals and/or alkaline earth metals.

Specific examples thereof include sodium acetylacetonate, potassium acetylacetonate, lithium acetylacetonate, ethyl acetoacetate sodium salt, ethyl acetoacetate cesium salt, dimethyl malonate sodium salt, dibutyl malonate potassium salt, sodium hydroxide, potassium hydroxide, lithiumhydroxide, sodium bicarbonate, potassium bicarbonate, lithium bicarbonate, sodium carbonate, potassium carbonate, lithium carbonate, cesium carbonate, sodium acetate, potassium acetate, lithium acetate, sodium nitrate, potassium nitrate, rubidium nitrate, lithium nitrate, sodium nitrite, potassium nitrite, rubidium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, cesium thiocyanate, sodium naphthenate, potassium naphthenate, sodium stearate, potassium stearate, lithium stearate, cesium stearate, sodium borohydride, potassium borohydride, lithium borohydride, sodium tetraphenyl borate, sodium benzoate, potassium benzoate, lithium benzoate, disodium hydrogen phosphate, dipotassium hydrogen phosphate, dilithium hydrogen phosphate, disodium salts, dipotassium salts, dilithium salts, monosodium salts, monopotassium salts, sodium potassium salts and sodium lithium salts of bisphenol A, and sodium salts, potassium salts and lithium salts of phenols.

(II) Basic Nitrogen Compounds (Nitrogen-containing Basic Compounds)

The basic nitrogen compounds are exemplified by the imidazole-based compounds, basic ammonium compounds and amines represented by the following chemical formulae (II-a), (II-b) and (II-c).

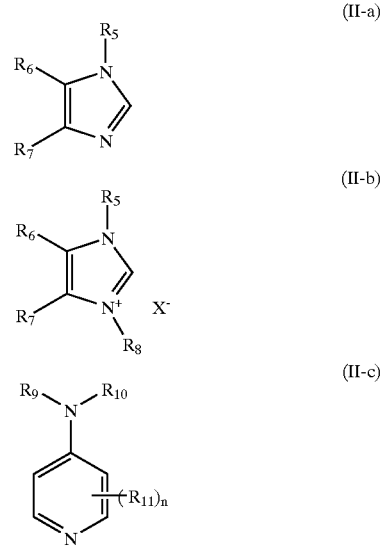

wherein $R_5$ is an alkyl group having 1 to 6 carbon atoms, a cycloalkyl group having 5 to 10 carbon atoms or an aralkyl group having 6 to 12 carbon atoms; $R_6$ and $R_7$ are independently an atom or group selected from the group consisting of a hydrogen atom, a halogen atom, an alkyl group having 1 to 6 carbon atoms, a cycloalkyl group having 5 to 10 carbon atoms, an aryl group having 6 to 12 carbon atoms and an aralkyl group having 6 to 12 carbon atoms; $R_8$ is a hydrogen atom or an alkyl group having 1 to 6 carbon atoms; X— is an anion which is present with stability; $R_9$ and $R_{10}$ are independently a hydrogen atom or a group selected from the group consisting of an alkyl group having 1 to 6 carbon atoms, a cycloalkyl group having 5 to 10 carbon atoms, an aryl group having 6 to 12 carbon atoms and an aralkyl group having 6 to 12 carbon atoms or may be bonded to each other to form a ring; $R_{11}$ is an atom or group selected from the group consisting of a hydrogen atom, a halogen atom, an alkyl group having 1 to 6 carbon atoms, a cycloalkyl group having 5 to 10 carbon atoms and an aralkyl group having 6 to 12 carbon atoms; and n is an integer of 1 to 4.

Of the imidazole-based compounds, illustrative examples of the compound represented by the above chemical formula (II-a) include 1-methylimidazole, 1-ethylimidazole, 1-butylimidazole, 1-cyclohexylimidazole, 1-phenylimidazole, 1,4-dimethylimidazole, 1,5-dimethylimidazole, 1-methyl-5-chloroimidazole and 1,4,5-trimethylimidazole. Of these, 1-methylimidazole and 1-butylimidazole are particularly preferable.

Further, the compound represented by the above chemical formula (II-b) corresponds to the compound obtained by quarternarizing the imidazole ring of the compound represented by the above chemical formula (II-a). In the above chemical formula (II-b), $R_8$ is selected from a hydrogen atom and an alkyl group having 1 to 6 carbon atoms and is suitably an alkyl group having 1 to 3 carbon atoms; and X— is an anion which can be present with stability and is exemplified by an acetate anion, benzoate anion, p-toluenesulfonate anion, chloride, bromide, sulfate ion and nitrate ion. Illustrative examples of the organic acid salts include acetates, benzoates and p-toluenesulfonates. Illustrative examples of the inorganic acid salts include hydrochlorides, sulfates and nitrates.

Further, the compound represented by the above chemical formula (II-c) corresponds to the compound obtained by quarternarizing the imidazole ring of the compound represented by the above chemical formula (II-b). Illustrative examples thereof include 1,3-dimethylimidazolium chloride, 1,3-dimethylimidazolium bromide, 1,3-dimethylimidazolium acetate and 1-butyl-3-methylimidazolium bromide. Of these, organic acids are particularly preferable, and benzoates are preferable, for example.

Further, illustrative examples of the basic ammonium compounds include ammonium hydroxides having an alkyl group, aryl group or alkylaryl group in a molecule such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($\phi$—$CH_2(Me)_3NOH$) and hexadecyltrimethylammonium hydroxide; and basic ammonium salts having an alkyl group, aryl group or alkylaryl group such as tetramethylammonium acetate, tetraethylammonium phenoxide, tetrabutylammonium carbonate, benzyltrimethylammonium benzoate and hexadecyltrimethylammonium ethoxide.

Illustrative examples of the amines include tertiary amines such as nonylamine, decylamine, stearylamine, dibutylamine, N-methylnonylamine, N-methyldecylamine, distearylamine, triethylamine, tributylamine, dimethylbenzylamine and hexadecyldimethylamine; alicyclic amines such as piperazine, piperidine, 4-methylpiperidine, N-methylpiperidine and N,N'-dimethylpiperazine; cyclic tertiary amines such as 1,4-diazabicyclo(2,2,2)octane (DABCO), 1,5-diazabicyclo(4,3,0)nonene (DBN) and 1,8-diazabicyclo(5,4,0)undecene (DBU); and basic salts such as tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate ($Me_4NBPh_4$)

(III) Basic Phosphorus Compounds (Phosphorus-containing Basic Compounds)

Illustrative examples of the basic phosphorus compounds include phosphonium hydroxides having an alkyl group, aryl group, alkylaryl group or other group such as tetramethylphosphonium hydroxide ($Me_4POH$), tetraethylphosphonium hydroxide ($Et_4POH$), tetrabutylphosphonium hydroxide ($Bu_4POH$), benzyltrimethylphosphonium hydroxide ($\phi$—$CH_2(Me)_3POH$) and hexadecyltrimethylphosphonium hydroxide; and basic salts such as tetramethylphosphonium borohydride ($Me_4PBH_4$), tetrabutylphosphonium borohydride ($Bu_4PBH_4$), tetrabutylphosphonium tetraphenylborate ($Bu_4PBPh_4$) and tetramethylphosphonium tetraphenylborate ($Me_4PBPh_4$).

Of the catalysts which are preferably used in the present invention, sodium acetylacetonate, potassium acetylacetonate, lithium acetylacetonate, ethyl acetoacetate sodium salt, ethyl acetoacetate cesium salt, dimethyl malonate sodium salt, dibutyl malonate potassium salt, sodium naphthenate and potassium naphthenate are preferable as the above alkali metal compounds or alkaline earth metal compounds (I).

Further, as the above basic nitrogen compounds (II), aliphatic tertiary monoamines such as triethylamine, dimethylbenzylamine and hexadecyldimethylamine; alicyclic monoamines such as piperidine, piperazine, 4-methylpiperidine, N-methylpiperidine and N,N'-dimethylpiperidine; and cyclic tertiary poly-amines such as 1,4-diazabicyclo(2,2,2)octane (DABCO), 1,5-diazabicyclo(4,3,0)nonene (DBN) and 1,8-diazabicyclo(5,4,0)undecene (DBU) are preferable.

As the above compounds (III), basic salts such as tetramethylphosphonium borohydride ($Me_4PBH_4$), tetrabutylphosphonium borohydride ($Bu_4PBH_4$), tetrabutylphosphonium tetraphenylborate ($Bu_4PBPh_4$) and tetramethylphosphonium tetraphenylborate ($Me_4PBPh_4$) are preferable.

Further, the above compounds may be used together with conventionally known transesterification catalysts. As these transesterification catalysts, the same catalysts as those exemplified in the description of the production of the linear polycarbonate can be used.

In the method of the present invention, the basic catalysts are used in an amount of preferably $1\times10^{-8}$ to $1\times10^{-2}$ moles, more preferably 50 to 2,000 micromoles, particularly preferably 100 to 1,000 micromoles, per polycarbonate recurring unit of the linear polycarbonate. Further, the basic catalysts are preferably used in an amount of $1\times10^{-7}$ to $1\times10^{-2}$ moles per mole of the cyclic acid anhydride groups of the acid anhydride.

By using the catalysts in the above proportion, the reaction can proceed smoothly. Using the catalysts in too small an amount is not preferable from the viewpoint of the proceeding of the reaction. On the other hand, when the amount of the catalysts is excessive, an increase in the occurrence of undesirable side reactions caused by the catalysts such as the decomposition or coloration of the polymer is concerned.

(D) Reaction Conditions

In the method of the present invention, the target thermoplastic branched polycarbonate of good quality is produced by causing the linear polycarbonate and the acid anhydride as raw materials to contact and react with each other in a molten state in an extruder in the presence of the above catalysts.

The type of the extruder which can be used in the method of the present invention is not particularly limited, and an ordinary single-screw or twin-screw extruder can be suitably used. Further, a horizontal-type single-screw or twin-screw extruder-type polymerizer for producing a high-viscosity molten polymer such as a polycarbonate or polyarylate is preferably used. The reaction pressure in the extruder may be selected from normal pressure, high pressure or reduced pressure as desired. The method of the present invention is carried out preferably under reduced pressure.

It is difficult to measure the reaction temperature in the extruder accurately. The reaction temperature is generally controlled by the cylinder temperature of the extruder. The cylinder temperature is preferably 200 to 400° C., more preferably 240 to 400° C. The actual temperature should be adjusted to relatively high temperatures or relatively low temperatures in the above temperature range according to the reactivity of an acid anhydride to be added and reacted. Taking the case where pyromellitic anhydride which is a typical acid anhydride is used as an example, a temperature range of preferably 220 to 400° C., more preferably 240 to 380° C., is selected. The reaction atmosphere is preferably an inert gas atmosphere for the purpose of preventing the degradation of the polymer at the time of the reaction. The reaction time in the extruder is practically and preferably selected from about 1 to 30 minutes.

The pressure at the time of the reaction is preferably lower than atmospheric pressure and is preferably not higher than 500 Torr, more preferably not higher than 200 Torr, particularly preferably not higher than 100 Torr. By setting the reduced pressure within the above range, the impurities which are by-produced during the branching reaction can be removed, and the color tone, hydrolysis resistance and the like of the produced branched polycarbonate can be improved.

(E) Thermoplastic Branched Polycarbonate and Resin Composition Thereof

According to the method of the present invention, a thermoplastic branched polycarbonate wherein the structural viscosity index (N) in the expression: $Q = K \cdot P^N$ (wherein Q is a flow rate (mL/sec) of a molten resin, K is a constant, P is pressure ($kg/cm^2$) and N is a structural viscosity index) is not smaller than 1.36, preferably 1.36 to 3.5, more preferably 1.5 to 3.5, is preferably produced.

The viscosity-average molecular weight of the branched polycarbonate is preferably 10,000 to 50,000, more preferably 15,000 to 45,000, much more preferably 19,000 to 40,000. A branched polycarbonate having a viscosity-average molecular weight of lower than 10,000 is liable to be blown nonuniformly at the time of blow molding and may be molded into an article whose thickness is relatively nonuniform. A branched polycarbonate having a viscosity-average molecular weight of higher than 50,000 is liable to have excessively increased melt viscosity which makes it difficult to mold the polycarbonate.

The thermoplastic branched polycarbonate produced by the method of the present invention preferably has a melt viscosity stability of not higher than 0.5%. For blow molding, a thermoplastic branched polycarbonate having a melt viscosity stability of preferably not higher than 0.3%, more preferably not higher than 0.1%, particularly preferably almost 0%, is used.

To obtain a thermoplastic branched polycarbonate having a melt viscosity stability of preferably not higher than 0.5%, more preferably not higher than 0.3, means is employed in which a specific amount of a melt viscosity stabilizer is added at an appropriate step after the completion of the reaction for producing the linear polycarbonate, particularly preferably right after the completion of the branching reaction of the linear polycarbonate. By the means, the basic catalysts are deactivated and the polycarbonate loses polycondensation activity, thereby attaining desired melt viscosity stability.

A thermoplastic branched polycarbonate resin having poor melt viscosity stability exhibits not only poor stability at the time of molding but also unstable mechanical properties, particularly significant deterioration or degradation in impact resistance, at high humidities and during its long-term use as a molded article and cannot therefore be put to practical use.

(Melt Viscosity Stabilizer)

Illustrative examples of a melt viscosity stabilizer which is suitably used to obtain the melt viscosity stability as described above include the following (a) phosphonium sulfonates and ammonium sulfonates such as tetrabutylphosphonium octylsulfonate, tetramethylphosphonium benzenesulfonate, tetrabutylphosphonium p-toluenesulfonate, tetrabutylphosphonium dodecylbenzenesulfonate; tetramethylammonium decylsulfonate, tetraethylammonium benzenesulfonate and tetrabutylammonium dodecylbenzenesulfonate and (b) sulfonic acids and lower esters thereof such as aromatic sulfonic acids, e.g., benzenesulfonic acid and p-toluenesulfonic acid; aliphatic sulfonic acids, e.g., dodecyl sulfonic acid; methyl benzenesulfonate, butyl benzenesulfonate, octyl benzenesulfonate, methyl p-toluenesulfonate, ethyl p-toluenesulfonate, butyl p-toluenesulfonate, phenyl p-toluenesulfonate, methyl dodecylsulfonate and ethyl hexadecylsulfonate. Of these, sulfonic ester compounds are preferably used.

It is effective to add the melt viscosity stabilizer to the branched polycarbonate produced from the linear polycarbonate produced by the phosgene method. Further, the melt viscosity stabilizer is used in an amount of 0.7 to 100 chemical equivalents, preferably 0.8 to 30 chemical equivalents, more preferably 0.9 to 20 chemical equivalents, particularly preferably 0.9 to 10 chemical equivalents, in the case of the compounds in the above (a), or in an amount of 0.7 to 20 chemical equivalents, preferably 0.8 to 10 chemical equivalents, more preferably 0.9 to 5 chemical equivalents, in the case of the compounds in the above (b), per chemical equivalent of the alkali metal elements in the basic alkali metal compound, that is, the basic alkali metal compound catalyst which remains in a linear polycarbonate produced particularly by a melt polymerization method or solid phase polymerization method.

Further, when the melt viscosity stabilizer in the above (b) is used, it is preferable to subject a polycarbonate resin containing the melt viscosity stabilizer to reduced-pressure treatment. The type of apparatus for conducting the reduced-pressure treatment is not particularly limited. On the other hand, when the melt viscosity stabilizer in the above (a) is used, the reduced-pressure treatment does not need to be conducted.

The reduced-pressure treatment can be conducted in a vertical vessel-type reactor, horizontal vessel-type reactor or horizontal type single-screw or twin-screw vented extruder under a reduced pressure of 0.05 to 60 mmHg, preferably 0.05 to 100 mmHg. The reduced-pressure treatment can be conducted for 5 minutes to 3 hours when a vessel-type reactor is used or for 5 seconds to 15 minutes when a twin-screw extruder is used at temperatures of 240 to 350° C. The reduced-pressure treatment can be conducted in an extruder concurrently with pelletization. By conducting the above reduced-pressure treatment, the amount of raw-material monomers remaining in the branched polycarbonate are decreased or the monomers can be removed completely.

(Thermal Stabilizers)

Although a significantly wide variety of thermal stabilizers need not to be added to the branched polycarbonate resin obtained by the method of the present invention, the branched polycarbonate resin may be used with conventional thermal stabilizers contained therein as required in such an amount that does not impair the objects of the present invention. Illustrative examples of the stabilizers include phosphorus-based stabilizers, phenol-based stabilizers, organic thioether-based stabilizers and hindered amine-based stabilizers, excluding those listed above. These may be used solely or in combination of two or more.

Although a variety of thermal stabilizers for polycarbonates are known, the following compounds can be used in the method of the present invention:

(1) arylalkyl phosphites such as bis(2,4-di-t-butylphenyl) pentaerythrityl diphosphite, bis(2,6-di-t-butyl-4-methylphenyl)pentaerythrityl diphosphite, bis(nonylphenyl)pentaerythrityl diphosphite, phenyldiisooctyl phosphite, 2-ethylhexyldiphenyl phosphite, tetraphenylpropylene glycol diphosphite, tetrakis(tridecyl)-4,4'-isopropylidenediphenyl diphosphite and 2,2-methylenebis(4,6-di-t-butylphenyl)octyl phosphite;

(2) trialkyl phosphites such as trimethyl phosphite, trinonyl phosphite, trioctadecyl phosphite, bis(tridecyl) pentaerythrityl diphosphite and tris(2-chloroethyl) phosphite;
(3) tricycloalkyl phosphites such as tricyclohexyl phosphite;
(4) triaryl phosphites such as triphenyl phosphite, tris(2,4-di-t-butylphenyl)phosphite and tris(nonylphenyl) phosphite;
(5) other phosphorous acid-based compounds such as a pentaerythrityl phosphite polymer of hydrogenated bisphenol A;
(6) arylalkyl phosphates such as bis(2,4-di-t-butylphenyl) pentaerythrityl diphosphate, pentaerythrityl(2,4-di-t-butylphenyl)phosphite(2,4-di-t-butylphenyl)phosphate, bis(nonylphenyl)pentaerythrityl diphosphate, pentaerythrityl(nonylphenyl)phosphite(nonylphenyl) phosphate, diphenylisooctyl phosphate, 2-ethylhexyldiphenyl phosphate, tetraphenylpropylene glycol diphosphate, tetra(tridecyl)-4,4'-isopropylidenediphenyl diphosphate and 2,2-methylenebis(4,6-di-t-butylphenyl)octyl phosphate;
(7) trialkyl phosphates such as trimethyl phosphate. trinonyl phosphate, tridecyl phosphate, trioctadecyl phosphate, distearylpentaerythrityl diphosphate, stearyl phosphate, bis(tridecyl)pentaerythrityl diphosphate, pentaerythrityl-tridecyl phosphate and tridecyl phosphate;
(8) tricycloalkyl phosphates such as tricyclohexyl phosphate;
(9) triaryl phosphates such as triphenyl phosphate, tricresyl phosphate, tris(2,4-di-t-butylphenyl)phosphate, tris (nonylphenyl)phosphate and tris(hydroxyphenyl) phosphate;
(10) other phosphoric esters such as a pentaerythrityl phosphate polymer of hydrogenated bisphenol A;
(11) phosphorous acid-based stabilizers other than those listed above, such as tetrakis(2,4-di-t-butylphenyl)-4,4-biphenylene diphosphonite and tetrakis(2,4-di-t-butylphenyl)-4,4'-phenylenendiphosphonite;
(12) phenol-based stabilizers such as n-octadecyl-3-(4'-hydroxy-3', 5'-di-t-butylphenyl)propionate, tetrakis{methylene-3-(3', 5'-di-t-butyl-4-hydroxyphehyl) propionate}methane, 1,1,3-tris(2-methyl-4-hydroxy-5-t-butylphenyl)butane, distearyl(4-hydroxy-3-methyl-5-t-butylbenzyl)malonate, 1,6-hexanediol-bis{3-(3,5-di-t-butyl-4-hydroxyphenyl) propionate}, 2,4-bis-(n-octylthio)-6-(4-hydroxyphenyl-5,5-di-t-butyl-anilino)-1, 3,5-triazine, 2,2-thiodiethylenebis{3-(3,5-di-t-butyl-4-hydroxyphenyl)propionate}, 2,2-thiobis(4-methyl-6-t-butylphenol), 3,5-di-t-butyl-4-hydroxybenzyl phosphonate, tris(3,5-di-t-butyl-4-hydroxybenzyl) isocyanurate, 2,5,7,8-tetramethyl-2-(4',8',12',-trimethyltridecyl)chroman-6-ol and 4-hydroxymethyl-2, 6-di-t-butylphenol;
(13) thioether-based stabilizers such as dilauryl thiodipropionate, distearyl thiodipropionate, dimyristyl-3, 3'-thiodipropionate, 1-ditridecyl-3,3'-thiopropionate and pentaerythritol-tetrakis(β-lauryl-thio-propionate); and
(14) hindered amine-based stabilizers such as bis(1,2,2,6,6-pentamethyl-4-piperidyl)sebacate, 8-benzyl-7,7,9,9-tetramethyl-3-octyl-1,2,3-triazaspiro[4,5]undecane-2,4-dione, 4-benzoyloxy-2,2,6,6-tetramethylpiperidine and 2-(3,5-di-t-butyl-4-hydroxybenzyl)-2-n-butylmalonic acid bis(1,2,2,6,6-pentamethyl-4-piperidyl).

The above thermal stabilizers may be used solely or in combination of two or more. Of these thermal stabilizers, phosphates, particularly aromatic phosphates, are preferable. Above all, tris(2,4-di-t-butylphenyl)phosphite and bis (2,4-t-butylphenyl)pentaerythrityl diphosphite are particularly preferably used.

These thermal stabilizers are used in an amount of preferably 0.0001 to 5 parts by weight, more preferably 0.0005 to 1 part by weight, much more preferably 0.001 to 0.5 parts by weight, based on 100 parts by weight of the components constituting the branched polycarbonate resin.

(Acidic Substance-scavenging Agent)

Further, as an acidic substance-scavenging agent, a compound having at least one epoxy group in a molecule may be used. Illustrative examples of the acidic substance-scavenging agent include epoxidated soya bean oil, phenyl glycidyl ether, 3,4-epoxycyclohexylmethyl-3',4'-epoxycyclohexyl carboxylate, 2,3-epoxycyclohexylmethyl-3',4'-epoxycyclohexyl carboxylate, 3,4-epoxycyclohexylethylene oxide, bisphenol A diglycidyl ether, phthalic acid diglycidyl ester, hexahydrophthalic acid diglycidyl ester, bisepoxydicyclopentadienyl ether, cyclohexyl-2-methyl-3,4-epbxycyclohexyl carboxylate, 2-ethylhexyl-3',4'-epoxycyclohexyl carboxylate and 4,5-epoxytetrahydrophthalic acid anhydride.

Of these, alicyclic epoxy compounds are preferable, and 3,4-epoxycyclohexylmethyl-3',4'-epoxycyclohexyl carboxylate is particularly preferably used. Such an epoxy compound is added in an amount of 1 to 2,000 ppm, preferably 10 to 1,000 ppm, based on the resin components. These may be used solely or in admixture of two or more.

(Mold Releasing Agent)

Further, a mold releasing agent does not have to be used when the branched polycarbonate of the present invention is blow molded. However, when it is molded by a molding method using a mold or the like, a conventionally known mold releasing agent such as fatty acid ester of alcohol can be suitably used.

Illustrative examples of fatty acid ester-based mold releasing agents which are formed from aliphatic carboxylic acids and alcohols and preferably used include whole or partial ester compounds of saturated or unsaturated aliphatic mono-, di- or tri-carboxylic acids and saturated or unsaturated monohydric alcohols such as ethanol, butanol or stearyl alcohol, saturated or unsaturated dihydric alcohols such as ethylene glycol, 1,4-butenediol or diethylene glycol, saturated or unsaturated trihydric alcohols such as glycerol, saturated or unsaturated tetrahydric alcohols such as pentaerythritol or saturated or unsaturated penta- or higher-hydric alcohols such as dipentaerythritol. The terms "aliphatic carboxylic acids" as used herein include alicyclic carboxylic acids.

Illustrative examples of preferable mold releasing agents include esters of fatty acids represented by the formula: $C_nH_{2N+1}$—COOH or HOOC—$C_nH_{2n}$—COOH (wherein n is an integer of 5 to 34) and alcohols represented by the formula: $C_mH_{2m+1}$—$CH_2OH$, $(R1)(R2)C(CH_2OH)_2$, $(HOCH_2)_4$—C, $(R3)(CH_2OH)_2C$—R4—$C(CH_2OH)_2(R5)$, $(HOCH_2)_3$—C—R4—C—$(CH_2OH)_3$ or formula: $HOCH_2$—$CH_2$—$CH_2$—$CH_2$—$CH_2OH$ (wherein m is an integer of 1 to 20, R1 and R2 are independently an alkyl group which may have a substituent having 1 to 10 carbon atoms or form, together with the carbon atoms to which they are attached, a five- or six-membered ring, R3 and R5 are independently an alkyl group which may have a substituent having 1 to 4 carbon atoms, and R4 is an alkylene group having 1 to 4 carbon atoms or —$(CH_2)t$—O—$(CH_2)t$— (wherein t is an integer of 1 to 4)).

Specific examples of the carboxylic acids represented by the above formulae include stearic acid, valeric acid, caproic acid, capric acid, lauric acid, arachidic acid, behenic acid, lignoceric acid, cerotic acid, melissic acid, tetratriacontanoic acid, glutaric acid, adipic acid and azelaic acid. Specific examples of the alcohols represented by the above formulae include glycerine, 2,2-dihydroxyperfluoropropanol, neopentylene glycol, pentaerythritol, ditrimethylolpropane and dipentaerythritol. Specific examples of their esters include pentaerythritol tetrastearate, pentaerythritol tristearate, pentaerythritol monolaurate, glycerol tribehenate, glycerol dilaurate, glycerol monostearate, trimethylolpropane tricaprate, trimethylolpropane dioleate and trimethylolpropane monostearate.

As required, these fatty acid ester-based mold releasing agents can be used in combination with hydrocarbon-based mold releasing agents such as natural or synthetic paraffin wax, polyethylene wax, fluorocarbons and the like. Illustrative examples of fatty acid-based mold releasing agents include higher fatty acids and oxyfatty acids such as stearic acid and hydroxystearic acid. Illustrative examples of fatty acid amide-based mold releasing agents include fatty acid amides such as stearic amide and ethylenebisstearylamide and alkylenebisfatty acid amides such as erucic acid amide. Illustrative examples of alcohol-based mold releasing agents include aliphatic alcohols such as stearyl alcohol and cetyl alcohol, polyhydric alcohols, polyglycols and polyglycerols. In addition, polysiloxanes can also be used.

(Other Additives)

To achieve the desired objects, conventionally known light stabilizers and ultraviolet stabilizers and a variety of other additives can be added to the branched polycarbonate of the present invention.

For example, as light stabilizers, benzotriazole-based compounds such as 2-(3-t-butyl-2-hydroxy-5-methylphenyl)-5-chlorobenzotriazole, 2-(2-hydroxy-5-t-octylphenyl)benzotriazole and 2-{2-hydroxy-3-(3,4,5,6-tetrahydrophthalimidemethyl)phenyl}benzotriazole; benzophenone-based compounds such as 2-hydroxy-4-octyloxybenzophenone and 2-hydroxy-4-methoxy benzophenon; and benzoate-based compounds such as 2,4-di-t-butylphenyl 3,5-di-t-butyl-4-hydroxybenzoate can be used. As ultraviolet absorbers, cyanoacrylate-based compounds such as ethyl-2-cyano-3,3'-diphenylacrylate are used. These light stabilizers and ultraviolet absorbers can be used in an amount of generally 0.001 to 5 parts by weight, preferably 0.05 to 1.0 part by weight, more preferably 0.01 to 0.5 parts by weight, based on 100 parts by weight of the resin components. These may be used solely or in admixture of two or more.

In addition, as a quencher, a nickel-based quencher such as nickel dibutyldithiocarbamate; as a metal deactivator, a compound such as N,N'-{3-(3,5-di-t-butyl-4-hydroxyphenyl)propionyl}hydrazine; as a metal soap, a compound such as calcium stearate or nickel stearate; as a nucleating agent, a sorbitol-based or phosphate-based compound such as sodium di(4-t-butylphenyl)phosphonate, dibenzylidene sorbitol or methylenebis(2,4-di-t-butylphenol acid phosphate sodium salt) may be added.

Further, when an antistatic effect is desired, an antistatic agent such as a quaternary ammonium salt-based or alkylphosphate-based compound, e.g., (β-lauramidepropyl) trimethylammonium sulfate may be used. Further, when flame resistance is imparted t6 the resin composition or an article molded therefrom, halogen-containing phosphates such as tris(2-chloroethyl)phosphate; halides such as hexabromocyclododecane and decabromophenyl oxide; metal inorganic compounds such as antimony trioxide, antimony pentoxide and aluminum hydroxide; and mixtures thereof are used as a flame retardant.

Further, organic or inorganic coloring agents such as dyes or pigments can be added to the branched polycarbonate resin of the present invention as desired. Illustrative examples of the inorganic coloring agents include metal oxides such as titanium dioxide and iron oxide red; metal hydroxides such as alumina white; sulfides such as zinc sulfide; selenides; ferrocyanides such as iron blue; chromates such as zinc chromate and molybdate orange; sulfates such as barium sulfate; carbonates such as calcium carbonate; silicates such as ultramarine blue; phosphates such as manganese violet; carbon such as carbon black; and metal coloring agents such as bronze powder and aluminum powder. Illustrative examples of the organic coloring agents include nitroso-based coloring agents such as naphthol green B; nitro-based coloring agents such as naphthol yellow S; azo-based coloring agents such as lithol red, Bordeaux 10B, naphthol red and chromophthal yellow; phthalocyanine-based coloring agents such as phthalocyanine blue and fast sky blue; and condensed ring-based coloring agents such as indanthrone blue, quinacridone violet and dioxazine violet. These coloring agents may be used solely or in admixture of two or more. These coloring agents can be used in an amount of generally $1 \times 10^{-6}$ to 5 parts by weight, preferably $1 \times 10^{-6}$ to 3 parts by weight, more preferably $1 \times 10^{-5}$ to 1 part by weight, based on 100 parts by weight of the resin components.

The thermoplastic branched polycarbonate of the present invention may contain anti-gamma-ray stabilizers, flame retardants, fillers and the like as required in addition to the above additives.

Although these additives may be added to the thermoplastic branched polycarbonate, they may also be added at the time of producing the linear polycarbonate as long as they do not exert an adverse effect on the aforementioned branching reaction of the present invention.

The branched polycarbonate of the present invention is particularly excellent as a raw material for blow molding. Therefore, according to the present invention, an article blow-molded from the branched polycarbonate of the present invention is also provided.

The blow-molded article of the present invention can be produced by a blow-molding method known per se.

The branched aromatic polycarbonate constituting the blow-molded article of the present invention preferably has a structural viscosity index (N) of not smaller than 1.36, a viscosity-average molecular weight of 10,000 to 50,000 and a melt viscosity stability of not higher than 0.5%.

Further, the branched aromatic polycarbonate constituting the blow-molded article of the present invention preferably contains a thermal stabilizer comprising a phosphorus compound.

As described above, the thermoplastic branched polycarbonate produced by the method of the present invention, when molten, has a moderate structural viscosity index, excellent moldability, and particularly good storage stability, thermal stability and hue stability. Therefore, it is suitable for the stable production and molding of bottles, sheets, large parts and the like and suitable for use in blow molding, extrusion, vacuum molding and the like. Particularly, when blow-molded, the thermoplastic branched polycarbonate has the advantage that it causes neither drawdown nor a non-uniform thickness in a molded article. Therefore, hollow molded articles such as bottles can be efficiently produced from the thermoplastic branched polycarbonate.

Further, the thermoplastic branched polycarbonate of the present invention has the advantage that the amount of dihydric phenols in the produced thermoplastic branched polycarbonate does not increase as compared with the amount of dihydric phenols which are originally contained in the linear polycarbonate since a branching agent having at least two cyclic acid anhydride groups reacts with the linear polycarbonate with high efficiency. Such a characteristic can be said to be particularly preferably from the viewpoint of environmental protection.

Further, the amount of dihydric phenols remaining in the thermoplastic branched polycarbonate can be further decreased by employing a method in which an organic solvent solution of the thermoplastic branched polycarbonate is brought into contact with an alkali aqueous solution to cause the dihydric phenols in the organic solvent solution to be extracted into the alkali aqueous solution or a method in which salicylates which selectively and efficiently react with phenolic OH groups are added to and reacted with a linear polycarbonate before a branching reaction or a branched polycarbonate after the reaction. In particular, the amount of the dihydric phenols can be significantly decreased by adding the above salicylate compound described in U.S. Pat. No. 5,696,222 to the branched polycarbonate in an amount of 0.8 to 10 moles, more preferably 0.8 to 5 moles, particularly preferably 0.9 to 2 moles, per chemical equivalent of all phenolic OH groups contained in the molecules of the polymer and causing the mixture to react in the presence of the above catalysts under heating.

The thus-obtained branched polycarbonate of the present invention has excellent moldability and retention stability and particularly good thermal stability and hue stability and is suitable for achieving the objects of the present invention. Therefore, the branched polycarbonate of the present invention has the characteristics which are suitable for blow molding and extrusion and is extremely suitable as a polycarbonate resin for producing a hollow molded article by blow molding in particular.

[Analysis and Measurement Methods]

Next, a description will be given to methods for analyzing and measuring the parameters used in the present invention.

1) viscosity-average molecular weight of polycarbonate:
   The intrinsic viscosity $[\eta]$ was measured in methylene chloride in an Ubbellohde viscometer at 20° C. The viscosity-average molecular weight (MW) was calculated from the intrinsic viscosity by the following formula.

$$[\eta]=1.23\times10^{-4} MW^{0.83}$$

2) melt flow rate (MFR): This was measured at a temperature of 280° C. and under a load of 2.16 Kgf in accordance with JIS K 7210.

3) structural viscosity index:
   The pellets of the polycarbonate were charged into a KOKA-type flow tester (manufactured by Shimadzu Corporation) Cylinder having a nozzle diameter of 1 mm and a nozzle length of 10 mm, the applied pressure P (100 to 200 kg/cm$^2$) and the amount Q (mL/sec) of the flowed-out molten resin which corresponds to the pressure P were measured with the temperature maintained at 280° C., and the measured values were plotted on a log-log graph. The structural viscosity index was determined from the inclination of the obtained regression line.

4) drawdown ability (to be abbreviated as "ADD" hereinafter): The weight of a parison extruded from the die of a blow molding machine was measured when the parison hanging downwardly from the die reached a desired length. As shown in the following diagram, a curve PO was plotted with the length and weight of the parison being the horizontal and vertical axes, respectively. A tangent was drawn on the curve at the origin point, the weight Wpi of the parison which corresponded to the length Li of the parison and the weight Wbi on the tangent OB which corresponded to the length Li of the parison were measured, and DD (%) was calculated from the following formula.

$$DD (\%)=10033 (Wbi-Wpi)/Wbi$$

Further, the parison was formed by using the blow molding machine used for the measurement which was "Sumitomo Beclam SE51/BA2" of Sumitomo Heavy Industries, Ltd., and drawdownability was measured at Li=50 cm. The blow molding machine used had a screw having a diameter of 50 mm$\phi$ and a die having an external diameter of 60 mm$\phi$ and an internal diameter of 56 mm$\phi$.

5) thermal stability: Sample pellets were dried at 120° C. for 5 hours, molded test pieces (having a size of 70 mm×50 mm×2 mm) one of which was prepared by retaining the sample pellets in an injection molding machine (SG-150 of Sumitomo Heavy Industries, Ltd.) at a cylinder temperature of 340° C. for 10 minutes and the other of which was prepared without retaining the sample pellets in the injection molding machine, and a difference ($\Delta E$) in hue between the molded test pieces was measured. The difference ($\Delta E$) in hue was determined by measuring the L values, a values and b values of both test pieces in accordance with JIS Z 8730 by using a color-difference meter (model Z-1001DP of Nippon Denshoku) and inserting the differences ($\Delta L$, $\Delta a$ and $\Delta b$) between the L values, a values and b values into the following formula.

$$\Delta E=[(\Delta L)^2+(\Delta a)^2+(\Delta b)^2]^{1/2}$$

6) concentration of terminal OH groups: 0.02 Grams of the sample of the polymer was dissolved in 0.4 ml of heavy chloroform, and the concentration of terminal OH groups was measured at 20° C. by using $^1$H-NMR (EX-270 of JEOL).

7) melt viscosity stability: A change in melt viscosity was measured in absolute value for 30 minutes under a current of nitrogen and at a shear rate of 1 rad/sec and 300° C. by using the RAA-type flow analyzer of Rheometric Scientific F.E. Ltd. and a rate of change per minute-was determined. In order for the long-time stability of the polycarbonate resin composition to be good, this value should not exceed 0.5%.

8) content of free phenols: The content (ppm) of residual dihydric phenols in the polycarbonate resin was measured by the high-performance liquid chromatography of TOSOH CORPORATION.

EXAMPLES

The Examples and Comparative Examples of the present invention will be described in detail hereinafter. The present invention, however, shall not be limited thereto.

Reference Examples 1 to 3 are examples of the production of a linear polycarbonate by a melt polymerization method. The linear polycarbonates obtained in the Reference Examples are shown in the following Tables 2 and 4. Further, the abbreviations in the following Tables 1 to 4 represent the following compounds.

1) phosphorus compounds
   P-1=bis(2,6-di-t-butyl-4-methylphenyl)pentaerythritol-di-phosphite (product of Asahi Denka Kogyo K.K., PEP-36),
   P-2=bis(2,4-di-cumylphenyl) pentaerythritol-di-phosphite (product of Asahi Denka Kogyo K.K., PEP-45), P-3=tris(2,6-di-t-butyl-4-methylphenyl)phosphite (product of Asahi Denka Kogyo K.K., 2112), 2) branching agents (cyclic acid anhydride derivatives)

AA-1=pyromellitic dianhydride (molecular weight=218)

AA-2=3,3',4,4'-benzophenone tetracarboxylic dianhydride (molecular weight=320)

AA-3=3,3',4,4'-biphenyl tetracarboxylic dianhydride (molecular weight=294)

THPE=1,1,1-tris (4-hydroxyphenyl)ethane (molecular weight=306)

3) catalysts

C-1=4-N,N-dimethylaminopyridine (molecular weight=122)

C-2=2-methylimidazole (molecular weight=82)

C-3=sodium acetylacetate (molecular weight=122)

C-4=calcium dimethylmalonate (molecular weight=170)

C-5=sodium naphthenate (content of Na=5.76 wt %)

C-6=tributylamine (molecular weight=185)

C-7=piperidine (molecular weight=85)

C-8=diazabicyclooctane (DABCO) (molecular weight=112)

C-9=diazabicyclononene (DBN) (molecular weight=124)

C-10=diazabicycloundecene (DBU) (molecular weight=152)

C-11=tetrabutylphosphonium tetraphenyl borate (molecular weight=578)

The amounts of catalysts in the Tables are expressed by moles (1×10$^{-3}$ moles) per mole of the acid anhydride groups in cyclic acid anhydride derivatives used as branching agents. Further, the mixing temperatures were measured at the outlet of a twin-screw extruding reactor, and the mixing pressures were measured at the vent of the reactor.

Reference Example 1

(Melt Polymerization)

22.8 Kg of bisphenol A (BPA), 22.0 kg of diphenylcarbonate (DPC), and 0.004 g of NaOH and 0.91 g of tetramethylammonium hydroxide as polymerization catalysts were charged into a reactor equipped with a stirrer, a distilling column and a decompressor, the inside of the reactor was subjected to nitrogen substitution, and the mixture was then dissolved at 140° C. After the mixture was stirred for 30 minutes, the internal temperature of the reactor was raised to 180° C., the mixture was allowed to react at an internal pressure of 100 mmHg for 30 minutes, and produced phenol was distilled off.

Then, the pressure was gradually reduced as the internal temperature was raised to 200° C., and the mixture was allowed to react at 50. mmHg for 30 minutes while phenol was distilled off. Further, the internal temperature and pressure of the reactor were gradually increased to 220° C. and decreased to 30 mmHg, respectively, and the mixture was allowed to react at the temperature and pressure for 30 minutes. Thereafter, the mixture was allowed to react at 240° C. and 10 mmHg, 260° C. and 1 mmHg, and 260° C. and a pressure lower than 1 mmHg while the temperature was increased and the pressure was decreased by repeating the same procedure as described above to continue the reaction.

The polymerization reaction was eventually continued at the last temperature and pressure, and when it was determined from the stirring power of the polymerization reactor that the viscosity-average molecular weight of a polycarbonate resin reached 25,100, a portion of the polymer was sampled, and the viscosity-average molecular weight and the concentration of terminal OH groups were measured. Thus, a linear polycarbonate having a viscosity-average molecular weight of 25,100 and a concentration of terminal OH groups of 70 eq/ton was produced.

(Terminal-capping Reaction and Deactivation of Catalysts)

Based on 100 parts by weight of the polycarbonate, a terminal-capping agent (2-methoxycarbonylphenyl-phenyl-carbonate, to be abbreviated as "SAM-DPC" hereinafter) was added in the amounts shown in Table 1 and thermal stabilizers (phosphorus compounds) of the types shown in Table 1 were added in the amounts shown in Table 1 under a reduced pressure of 50 mmHg at 270° C. Then, the terminal-capping reaction was continued at 270° C. and a pressure of not higher than 1 mmHg for 5 minutes.

Thereafter, 3.4×10$^{-4}$ parts by weight (1.5-times equivalents of the Na catalyst) of melt viscosity stabilizer (tetrabutylphosphonium dodecylbenzenesulfonate, DBSP for short) was added, and the mixture was stirred and mixed at the above temperature and pressure for 10 minutes to deactivate the catalysts.

(Addition of Stabilizers)

Phosphorus compounds (thermal stabilizers) described in Examples were added based on 100 parts by weight of the polycarbonate subjected to the above treatment, and the resulting polycarbonates were mixed and pelletized by a twin-screw extruder. The physical properties of these resin compositions are shown in Table 2.

Reference Example 2

A linear polycarbonate was produced in the same manner as in Reference Example 1 except that the above melt viscosity stabilizer (DBSP) was not used.

Reference Example 3

A linear polycarbonate having a viscosity average molecular weight of 25,100 and a concentration of terminal OH groups of 140 eq/ton was produced by carrying out melt polymerization in the same manner as in Reference Example 1 except that the amount of diphenyl carbonate (DPC) was changed to 21.41 kg.

Examples 1 to 4 and Comparative Examples 1 to 3

Linear polycarbonates manufactured by Teijin Chemicals Ltd. (Trademark Registration "Panlite" K-1285, viscosity average molecular weight=28,500; and Trademark Registration "Panlite" L-1250, viscosity average molecular weight=23,700,) each in an amount of 100 parts by weight and branching agents (acid anhydrides and the like), catalysts and additives (phosphorus compounds) in the amounts (shown in parts by weight based on 100 parts by weight of the polycarbonates) shown in Table 1 were charged into a twin-screw extruder-type reactor ZSK25 (manufactured by Werner & Pfleiderer GmbH) and melt-mixed and allowed to react at a cylinder temperature of 340° C. and a vent pressure of 500 Torr for a residence time of 3 minutes, and obtained branched polycarbonates were pelletized.

The physical properties (viscosity average molecular weight, melt viscosity stability, structural viscosity index, thermal stability and the like) of the obtained thermoplastic branched polycarbonates are also shown in Table 1.

TABLE 1

|  | C.Ex.1 | C.Ex.2 | Ex.1 | Ex.2 | Ex.3 | C.Ex.3 | Ex.4 |
|---|---|---|---|---|---|---|---|
| Types of Linear Polycarbonate | K-1285 | K-1285 | K-1285 | K-1285 | K-1285 | L-1250 | L-1250 |
| Types of Phosphorus Compound | P-1 | P-1 | P-1 | P-2 | P-3 | P-1 | P-1 |
| Amount Used | 0.02 | 0.02 | 0.02 | 0.02 | 0.02 | 0.02 | 0.02 |
| Types of Branching Agent | nil | AA-1 | AA-1 | AA-2 | AA-3 | THPE | AA-1 |
| Amount used | — | 0.43 | 0.43 | 0.50 | 0.58 | 0.61 | 0.43 |
| Types of Catalyst | nil | nil | C-1 | C-1 | C-1 | C-2 | C-2 |
| Amount Used ($\times 10^{-3}$) | — | — | 4.8 | 4.8 | 4.8 | 6.4 | 6.4 |
| Mixing Pressure (Torr) | 500 | 500 | 500 | 500 | 500 | 500 | 500 |
| Viscosity Average Molecular Weight | 28,500 | 28,500 | 28,500 | 28,200 | 28,000 | 21,100 | 23,400 |
| (Molecular Weight Reduction Rate: %) | (0) | (0) | (0) | (1) | (2) | (11) | (1) |
| Melt Viscosity Stability (%) | 0 | 0 | 0 | 0 | 0 | 0 | 0 |
| Structural Viscosity Index (N) | 1.3 | 1.3 | 1.98 | 1.99 | 1.98 | 1.52 | 1.78 |
| Thermal Stability (ΔE) | 0.2 | 0.2 | 0.2 | 0.2 | 0.2 | 1.7 | 0.3 |
| Free Dihydric Phenols (ppm) | 10 | 15 | 22 | 25 | 25 | 125 | 24 |
| MFR | 4.5 | 4.1 | 1.5 | 1.6 | 1.8 | 4.3 | 2.5 |
| DD (%) | 55 | 55 | 36 | 40 | 43 | 63 | 45 |

Ex.: Example, C.Ex.: Comparative Example

Comparative Example 3 and Example 4 in Table 1 show a comparison between the case where the above acid anhydride was used as a branching agent and the case where the above triphenol was used as a branching agent. It is understood from this table that a branched polycarbonate having a high structural viscosity index and good thermal stability can be obtained only when a specific acid anhydride was used as a branching agent together with a specific catalyst and that when the polyhydric phenol was used as a branching agent (Comparative Example 3), on the other hand, a reduction in molecular weight is large and thermal stability is poor.

Examples 5 to 9 and Comparative Example 4

100 Parts by weight of the linear polycarbonates of the above Reference Examples 1 to 3 which were produced by a melt polymerization method, and the branching agents (acid anhydrides), catalysts and additives (SAM-DPC, phosphorus compounds) shown in Table 2 in the amounts (parts by weight) shown in Table 2 were charged into a twin-screw extruder-type reactor ZSK25 (manufactured by Werner & Pfleiderer GmbH), melt-mixed and allowed to react at a cylinder temperature of 340° C. and a vent pressure of 500 Torr for a residence time of 3 minutes and pelletized in the same manner as in Examples 1 to 4. The physical properties of the obtained thermoplastic branched polycarbonates are also shown in Table 2.

TABLE 2

|  | C.Ex.4 | Ex.5 | Ex.6 | Ex.7 | Ex.8 | Ex.9 |
|---|---|---|---|---|---|---|
| Types of Linear Polycarbonate | R.Ex.1 | R.Ex.1 | R.Ex.1 | R.Ex.1 | R.Ex.2 | R.Ex.3 |
| Amount of SAM-DPC Added (parts by weight) | 1.9 | 1.1 | 0.96 | 1.9 | 1.9 | 0 |
| Types of Phosphorus Compound | P-1 | P-1 | P-1 | P-2 | P-1 | P-1 |
| Amount used | 0.02 | 0.02 | 0.02 | 0.03 | 0.02 | 0.02 |
| Types of Branching Agent | nil | AA-1 | AA-1 | AA-3 | AA-1 | AA-1 |
| Amount used | — | 0.43 | 0.43 | 0.43 | 0.43 | 0.43 |
| Types of Catalyst | nil | C-1 | C-1 | C-2 | C-1 | C-1 |
| Amount Used ($\times 10^{-3}$) | — | 4.8 | 4.8 | 6.4 | 4.8 | 4.8 |
| Mixing Pressure (Torr) | 500 | 500 | 500 | 500 | 500 | 500 |
| Viscosity Average Molecular Weight | 25,100 | 25,100 | 25,100 | 25,100 | 25,100 | 25,100 |
| Concentration of OH Groups (eq/ton) | 10 | 20 | 40 | 10 | 10 | 140 |
| Melt Viscosity Stability (%) | 0 | 0 | 0 | 0 | 2.5 | 0 |
| Structural Viscosity Index (N) | 1.34 | 1.87 | 1.87 | 1.87 | 1.87 | 1.84 |
| Thermal Stability (ΔE) | 0.4 | 0.4 | 0.5 | 0.4 | 1.7 | 0.4 |
| Free Dihydric Phenols (ppm) | 30 | 27 | 35 | 36 | 40 | 52 |
| MFR | 8.2 | 2.8 | 2.6 | 2.5 | 2.8 | 2.9 |
| DD (%) | 73 | 45 | 43 | 40 | 48 | 49 |

Ex.: Example, C.Ex.: Comparative Example, R.Ex.: Reference Examplephenoladditivespolycarbonate resin molding material for optical use and optical disk substratemil As is clear from Example 9, when the concentration of terminal OH groups of the linear polycarbonate was increased to 140 eq/ton, for unknown reasons but unexpectedly, the proceeding of the branching reaction was remained at a low level as compared with those having a low concentration of terminal OH groups (Examples 7 and 8).

Examples 10 to 15

The same experiments as that of Example 1 were carried out except that the amount of the branching agent used in Example 1 was changed to the amounts shown in Table 3, the catalysts shown in Table 3 were used in the amounts shown in Table 3 and the reduced pressure at the time of mixing was set at 100 to 10 Torr as shown in Table 3. The results are shown in Table 3. Further, in Examples 12 and 13 where alkali metal catalysts were used, melt viscosity stabilizers (DBSP) were further added in two-times equivalents of the alkali metal catalysts from the last inlet of the above extrusion-type reactor.

TABLE 3

|  | Ex.10 | Ex.11 | Ex.12 | Ex.13 | Ex.14 | Ex.15 |
| --- | --- | --- | --- | --- | --- | --- |
| Types of Linear Polycarbonate | K-1285 | K-1285 | K-1285 | K-1285 | K-1285 | K-1285 |
| Types of Phosphorus Compound | P-1 | P-1 | P-1 | P-1 | P-1 | P-1 |
| Amount Used | 0.02 | 0.02 | 0.02 | 0.02 | 0.02 | 0.02 |
| Types of Branching Agent | AA-1 | AA-1 | AA-1 | AA-1 | AA-1 | AA-1 |
| Amount used | 0.17 | 0.09 | 0.09 | 0.09 | 0.09 | 0.09 |
| Types of Catalyst | C-1 | C-1 | C-3 | C-5 | C-7 | C-9 |
| Amount Used ($\times 10^{-3}$) | 1.9 | 1.0 | 1.0 | 3.1 | 0.7 | 1.0 |
| Mixing Pressure (Torr) | 100 | 10 | 10 | 10 | 10 | 10 |
| Viscosity Average Molecular Weight | 28,400 | 28,500 | 28,400 | 28,500 | 28,500 | 28,500 |
| Melt Viscosity Stability (%) | 0 | 0 | 0 | 0 | 0 | 0 |
| Structural Viscosity Index (N) | 1.98 | 2.10 | 2.00 | 2.00 | 1.99 | 1.99 |
| Thermal Stability (ΔE) | 0.1 | 0.1 | 0.1 | 0.1 | 0.1 | 0.1 |
| Free Dihydric Phenols (ppm) | 20 | 15 | 13 | 12 | 15 | 15 |
| MFR | 1.52 | 1.5 | 1.5 | 1.5 | 1.5 | 1.5 |
| DD (%) | 39 | 39 | 38 | 40 | 39 | 39 |

Ex.: Example

Examples 16 to 20

The same experiments as that of Example 7 were carried out except that the amount of acid anhydrides as the branching agent used in Example 7 was changed to the amounts (0.03 parts by weight based on 100 parts by weight of the linear polycarbonates) shown in Table 4, the catalysts shown in Table 4 were used in the amounts shown in Table 4 and the reduced pressure at the time of mixing was set at 20 Torr as shown in Table 4. The results are shown in Table 4.

TABLE 4

|  | Ex.16 | Ex.17 | Ex.18 | Ex.19 | Ex.20 |
| --- | --- | --- | --- | --- | --- |
| Types of Linear Polycarbonate | R.Ex.1 | R.Ex.1 | R.Ex.1 | R.Ex.1 | R.Ex.1 |
| Amount of SAM-DPC Added (parts by weight) | 1.9 | 1.9 | 1.9 | 1.9 | 1.9 |
| Types of Phosphorus Compound | P-2 | P-2 | P-2 | P-2 | P-2 |
| Amount used | 0.03 | 0.03 | 0.03 | 0.03 | 0.03 |
| Types of Acid Anhydride | AA-1 | AA-1 | AA-3 | AA-1 | AA-1 |
| Amount used | 0.09 | 0.09 | 0.09 | 0.09 | 0.09 |
| Types of Catalyst | C-4 | C-6 | C-8 | C-10 | C-11 |
| Amount Used ($\times 10^{-3}$) | 1.3 | 1.5 | 0.9 | 1.2 | 4.5 |
| Mixing Pressure (Torr) | 20 | 20 | 20 | 20 | 20 |
| Viscosity Average Molecular Weight | 25,100 | 25,100 | 25,100 | 25,100 | 25,100 |
| Concentration of OH Groups (eq/ton) | 20 | 40 | 10 | 10 | 10 |
| Melt Viscosity Stability (%) | 0 | 0 | 0 | 0 | 0 |
| Structural Viscosity Index (N) | 1.91 | 1.92 | 1.91 | 1.91 | 1.91 |
| Thermal Stability (ΔE) | 0.1 | 0.1 | 0.1 | 0.1 | 0.1 |
| Free Dihydric Phenols (ppm) | 15 | 14 | 15 | 16 | 16 |
| MFR | 2.3 | 2.3 | 2.3 | 2.3 | 2.3 |
| DD (%) | 43 | 42 | 42 | 42 | 42 |

Ex.: Example, R.Ex.: Reference Example

Example 21

A parison was molded by using the branched polycarbonate obtained in Example 1 and a blow molding machine, Sumitomo Beclam SE51/BA2 of Sumitomo Heavy Industries, Ltd., clamped and air-blown under the following conditions to form a box-shaped blow-molded article having a size of W100 mm×T40 mm×H300 mm.

Size of die:
   external diameter=60 mmφ
   internal diameter=56 mmφ
Temperature of cylinder: 260° C.
RPM of cylinder: 20 rpm
Diameter of screw: 50 mmφ
Temperature of Mold: 60° C.
Blown air pressure: 5 Kgf/cm²

In this case, blow-moldability was good, and the parison had extremely little drawdowns. Further, the surface of the obtained box-shaped molded article was also good.

What is claimed is:

1. A method for producing a branched aromatic polycarbonate, which comprises mixing a linear aromatic polycarbonate which mainly comprises a recurring unit represented by the following formula (1):

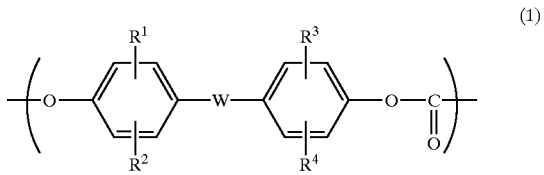

(1)

wherein $R^1$, $R^2$, $R^3$ and $R^4$ are independently a hydrogen atom, an alkyl group having 1 to 10 carbon atoms, an aryl group having 6 to 10 carbon atoms or an aralkyl group having 7 to 10 carbon atoms; and W is an alkylene group having 1 to 10 carbon atoms, an alkylidene group having 2 to 10 carbon atoms, a cycloalkylene group having 6 to 10 carbon atoms, a cycloalkylidene group having 6 to 15 carbon atoms, an arylene group having 6 to 10 carbon atoms, an alkylene-arylene-alkylene group having 8 to 15 carbon atoms, an oxygen atom, a sulfur atom, a sulfoxide group, a sulfone group or a direct bond,
and which has a viscosity-average molecular weight of 10,000 to 50,000 and terminal OH groups in a proportion of 5 to 70 mol % based on the total of all terminal groups with an acid anhydride having at least two cyclic acid anhydride groups in the molecule whose amount is 0.01 to 1 mole per mole of the above recurring unit, in a molten state in the presence of a basic catalyst in an extruder to proceed with a reaction between the terminal OH groups of the linear aromatic polycarbonate and the acid anhydride.

2. The method of claim 1, wherein the linear aromatic polycarbonate is produced by an interfacial polycondensation method or a transesterification method.

3. The method of claim 1, wherein the linear aromatic polycarbonate has a viscosity-average molecular weight of 15,000 to 45,000.

4. The method of claim 1, wherein the basic catalyst is at least one basic compound selected from the group consisting of (I) an alkali metal compound, (II) an alkaline earth metal compound, (III) a basic nitrogen compound and (IV) a basic phosphorus compound.

5. The method of claim 1, wherein the basic catalyst is present in a proportion of $1 \times 10^{-7}$ to $1 \times 10^{-2}$ moles per mole of the cyclic acid anhydride groups in the acid anhydride.

6. The method of claim 1, wherein the acid anhydride has an acid anhydride group equivalent of 85 to 1,000.

7. The method of claim 1, wherein the acid anhydride is an aromatic tetracarboxylic dianhydride.

8. The method of claim 1, wherein the mixing is carried out in the extruder at 240 to 400° C.

9. The method of claim 1 or 8, wherein the mixing is carried out in the extruder under a reduced pressure of not higher than 26,600 Pa (200 Torr).

10. The method of claim 1, wherein the linear aromatic polycarbonate has its polycondensation activity lost by containing a melt viscosity stabilizer selected from the group consisting of a sulfonic acid, a phosphonium sulfonate, an ammonium sulfonate and a lower alkyl ester of sulfonic acid.

11. The method of claim 1, which further comprises the step of deactivating the basic catalyst by mixing a melt viscosity stabilizer selected from the group consisting of a sulfonic acid, a phosphonium sulfonate, an ammonium sulfonate and a lower alkyl ester of sulfonic acid into the produced branched aromatic polycarbonate in a molten state.

12. The method of claim 1, wherein the acid anhydride having at least two cyclic acid anhydride groups in a molecule is used in a form of a polycarbonate composition (master batch) containing the acid anhydride, the linear aromatic polycarbonate and either no basic catalyst or a deactivated basic catalyst.

13. A branched aromatic polycarbonate obtained by the method of claim 1.

14. The branched aromatic polycarbonate of claim 13, which has a structural viscosity index (N) of not smaller than 1.36, a viscosity-average molecular weight of 10,000 to 50,000 and a melt viscosity stability of not higher than 0.5%.

15. A blow-molded article comprising the branched aromatic polycarbonate produced by the method of claim 1.

16. The blow-molded article of claim 15, wherein the branched aromatic polycarbonate has a structural viscosity index (N) of not smaller than 1.36, a viscosity-average molecular weight of 10,000 to 50,000 and a melt viscosity stability of not higher than 0.5%.

17. The blow-molded article of claim 15, wherein the branched aromatic polycarbonate contains a thermoplastic stabilizer comprising a phosphorus compound.

* * * * *